United States Patent
Zhang et al.

(10) Patent No.: US 10,726,302 B2
(45) Date of Patent: Jul. 28, 2020

(54) EDGE COMPUTING

(71) Applicant: QUALCOMM Incorporated, San Diego, CA (US)

(72) Inventors: Shuai Zhang, San Diego, CA (US); Ying Chen, San Diego, CA (US); Yang Zhou, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 16/204,242

(22) Filed: Nov. 29, 2018

(65) Prior Publication Data

US 2020/0175334 A1    Jun. 4, 2020

(51) Int. Cl.
*G06K 9/62*    (2006.01)
(52) U.S. Cl.
CPC .......... *G06K 9/6262* (2013.01); *G06K 9/627* (2013.01); *G06K 9/6228* (2013.01)
(58) Field of Classification Search
None
See application file for complete search history.

(56) References Cited

U.S. PATENT DOCUMENTS

| | | | | |
|---|---|---|---|---|
| 2018/0137406 A1* | 5/2018 | Howard | ................ | G06N 3/082 |
| 2019/0130188 A1* | 5/2019 | Zhou | ................ | G06T 7/248 |
| 2019/0347537 A1* | 11/2019 | Howard | ................ | G06N 3/04 |
| 2020/0019628 A1* | 1/2020 | Chen | ................ | G06F 16/50 |

* cited by examiner

*Primary Examiner* — Dov Popovici
(74) *Attorney, Agent, or Firm* — Holland & Hart LLP

(57) ABSTRACT

Methods, systems, and devices for object localization and classification are described. A device may configure a first unit of a detection layer associated with a learning framework when a quantity of output feature channels of an input feature maps is less than or equal to a quantity of input feature channels of the input feature maps. The first set of layers may include a group convolution layer, a pointwise layer, a batch normalization layer, or a rectified linear layer, or a combination thereof. The device may also configure, a second unit of the detection layer associated with the learning framework, when a second quantity of output feature channels of the input feature maps is less than or equal to a second quantity of input feature channels of the input feature maps. The second set of layers may include a depthwise layer or a pointwise layer, or both.

20 Claims, 13 Drawing Sheets

EDGE COMPUTING

BACKGROUND

A deep neural network has been used with a single-shot detector framework for applications such as object classification and object localization. Although using deep neural networks with the single-shot detector framework may provide effective results to acquire the object classification and object localization information from an input image in some cases, this technique may be computationally exhaustive and complex for edge devices. Alternative techniques and devices for edge devices are desired.

SUMMARY

The described techniques relate to improved methods, systems, devices, and apparatuses that support edge computing. Generally, the described techniques provide for computing object classification and object localization, while increasing accuracy and reducing power consumption and latency related to the computing, among other advantages. To achieve these results, the described techniques herein support configurable detection layers for a learning framework such as, for example, a single-shot detector framework. For example, an enhanced depthwise separable detection unit (EDSDU) may include one or more detection layers of a learning framework. In some examples, the EDSDU may include one or more group convolutional layers, a depthwise layer, and one or more pointwise layers forming one or more units. A first unit may include a group convolutional layer, a batch normalization layer, and a pointwise layer; while a depthwise layer and pointwise layer may be included in a second unit.

Deep neural networks with the single-shot detector framework may be computationally exhaustive and complex for edge devices. For example, in computing the object classification and object localization information per inference, a 10 giga multiplier-accumulator (MAC) is needed. Some techniques may use MobileNet-based layers as a backbone for the deep neural network with the single-shot detector framework, to enable using the single-shot detector framework in edge devices, which may reduce the complexity of the backbone. Although reconfiguring the backbone to use MobileNet-based layers reduces the complexity of the backbone, detection layers used for the localization information and confidence computation remain computationally exhaustive and cannot be simply replaced by the MobileNet-based layers. As a result, existing techniques may be ineffective and an inefficient use of resources (e.g., computation power, latency, and accuracy) for edge devices for object classification and object localization computations.

A method of object localization and classification is described. The method may include determining, for a first unit of a detection layer associated with a learning framework, that a quantity of output feature channels of an input feature maps is less than or equal to a quantity of input feature channels of the input feature maps, configuring the first unit of the detection layer with a first set of layers based on the determining, the first set of layers including a group convolution layer, a pointwise layer, a batch normalization layer, or a rectified linear layer, or a combination thereof, determining, for a second unit of the detection layer associated with the learning framework, that a second quantity of output feature channels of the input feature maps is less than or equal to a second quantity of input feature channels of the input feature maps, and configuring the second unit of the detection layer with a second set of layers based on the determining, where the second set of layers includes a depthwise layer or a pointwise layer, or both.

An apparatus for object localization and classification is described. The apparatus may include a processor, memory in electronic communication with the processor, and instructions stored in the memory. The instructions may be executable by the processor to cause the apparatus to determine, for a first unit of a detection layer associated with a learning framework, that a quantity of output feature channels of an input feature maps is less than or equal to a quantity of input feature channels of the input feature maps, configure the first unit of the detection layer with a first set of layers based on the determining, the first set of layers including a group convolution layer, a pointwise layer, a batch normalization layer, or a rectified linear layer, or a combination thereof, determine, for a second unit of the detection layer associated with the learning framework, that a second quantity of output feature channels of the input feature maps is less than or equal to a second quantity of input feature channels of the input feature maps, and configure the second unit of the detection layer with a second set of layers based on the determining, where the second set of layers includes a depthwise layer or a pointwise layer, or both.

Another apparatus for object localization and classification is described. The apparatus may include means for determining, for a first unit of a detection layer associated with a learning framework, that a quantity of output feature channels of an input feature maps is less than or equal to a quantity of input feature channels of the input feature maps, configuring the first unit of the detection layer with a first set of layers based on the determining, the first set of layers including a group convolution layer, a pointwise layer, a batch normalization layer, or a rectified linear layer, or a combination thereof, determining, for a second unit of the detection layer associated with the learning framework, that a second quantity of output feature channels of the input feature maps is less than or equal to a second quantity of input feature channels of the input feature maps, and configuring the second unit of the detection layer with a second set of layers based on the determining, where the second set of layers includes a depthwise layer or a pointwise layer, or both.

A non-transitory computer-readable medium storing code for object localization and classification is described. The code may include instructions executable by a processor to determine, for a first unit of a detection layer associated with a learning framework, that a quantity of output feature channels of an input feature maps is less than or equal to a quantity of input feature channels of the input feature maps, configure the first unit of the detection layer with a first set of layers based on the determining, the first set of layers including a group convolution layer, a pointwise layer, a batch normalization layer, or a rectified linear layer, or a combination thereof, determine, for a second unit of the detection layer associated with the learning framework, that a second quantity of output feature channels of the input feature maps is less than or equal to a second quantity of input feature channels of the input feature maps, and configure the second unit of the detection layer with a second set of layers based on the determining, where the second set of layers includes a depthwise layer or a pointwise layer, or both.

Some examples of the method, apparatuses, and non-transitory computer-readable medium described herein may further include operations, features, means, or instructions for configuring the first set of layers to include a second group convolution layer after the group convolution layer, the batch normalization layer, or the rectified linear layer, or a combination thereof, based on determining that the quantity of output feature channels of the input feature maps may be less than or equal to the quantity of input feature channels of the input feature maps, where configuring the first unit of the detection layer may be based on configuring the first set of layers to include the second group convolution layer.

Some examples of the method, apparatuses, and non-transitory computer-readable medium described herein may further include operations, features, means, or instructions for configuring the second set of layers to include a second depthwise layer after the depthwise layer and the pointwise layer, based on determining that the second quantity of output feature channels of the input feature maps may be less than or equal to the second quantity of input feature channels of the input feature maps, where configuring the second unit of the detection layer may be based on configuring the second set of layers to include the second depthwise layer.

Some examples of the method, apparatuses, and non-transitory computer-readable medium described herein may further include operations, features, means, or instructions for configuring the second set of layers to include a second group convolution layer based on determining that the second quantity of output feature channels of the input feature maps may be less than or equal to the second quantity of input feature channels of the input feature maps, where configuring the second unit of the detection layer may be based on configuring the second set of layers to include the second group convolution layer and the pointwise layer.

In some examples of the method, apparatuses, and non-transitory computer-readable medium described herein, configuring the second set of layers comprises configuring the second set of layers such that the depthwise layer is absent from the second set of layers based at least in part on configuring the second set of layers with the second group convolution layer.

Some examples of the method, apparatuses, and non-transitory computer-readable medium described herein may further include operations, features, means, or instructions for tuning quantity of input feature channels based on a parameter of an application associated with the object localization and classification, the parameter including at least one of a latency, a memory usage, or a processing usage, or a combination thereof, where configuring the first unit or the second unit of the detection layer, or both may be based on the tuning.

Some examples of the method, apparatuses, and non-transitory computer-readable medium described herein may further include operations, features, means, or instructions for identifying the quantity of input feature channels of the input feature maps based on a parameter of an application associated with the object localization and classification, the parameter including a latency, a memory usage, or a processing usage, or a combination thereof, where configuring the first unit or the second unit of the detection layer, or both may be based on the identification.

Some examples of the method, apparatuses, and non-transitory computer-readable medium described herein may further include operations, features, means, or instructions for identifying the second quantity of input feature channels of the input feature maps based on the parameter of the application associated with the object localization and classification, where configuring the second unit of the detection layer may be based on the identification.

In some examples of the method, apparatuses, and non-transitory computer-readable medium described herein, the learning framework comprises a single-shot detector framework.

In some examples of the method, apparatuses, and non-transitory computer-readable medium described herein, the first unit and the second unit of the detection layer associated with the learning framework are associated with a backbone subnetwork.

In some examples of the method, apparatuses, and non-transitory computer-readable medium described herein, the second unit of the detection layer is absent from the batch normalization layer or the rectified linear layer, or both.

In some examples of the method, apparatuses, and non-transitory computer-readable medium described herein, the second quantity of input feature channels of the input feature maps associated with the second unit is less than the quantity of input feature channels of the input feature maps associated with the first unit.

In some examples of the method, apparatuses, and non-transitory computer-readable medium described herein, a width and height of the input feature maps associated with the second unit is less than a width and height of the input feature maps associated with the first unit.

DETAILED DESCRIPTION

The described techniques herein support efficient object classification and object localization computation, while increasing accuracy and decreasing power consumption and latency related to the computation, among other advantageous. Specifically, the described techniques herein may support configurable detection layers for a learning framework to achieve the aforementioned results. In some examples, the configurable detection layers may include an enhanced depthwise separable detection unit (EDSDU) to replace or modify detections layers of a learning framework (e.g., deep neural learning framework). The EDSDU may be configurable to include a group convolution layer, a depthwise layer, or a pointwise layer, or any combination to reduce the computational complexity of conventional techniques. The EDSDU may also include a quantity of these layers to preserve sufficient feature maps from an input image before outputting the object classification confidence and object localization information. In this way, the channel of features may be gradually reduced as compared to other MobileNet-based single shot detector solutions. For example, according to the described techniques herein, the complexity may be reduced from 1.98G multiply-and-accumulates (MAC) to 1.34G MAC (e.g., about 32% reduction).

Aspects of the disclosure are initially described in the context of a system. Aspects of the disclosure are then described in the context of a group convolution layer, a MobileNet-based unit, a single shot multibox detector framework, a detection layer, an enhanced depthwise separable detection unit (EDSDU), and a feature operation in a group convolution layer as some examples related various aspects of the present disclosure. Aspects of the disclosure are further illustrated by and described with reference to apparatus diagrams, system diagrams, and flowcharts that relate to edge computing.

Figure 1:
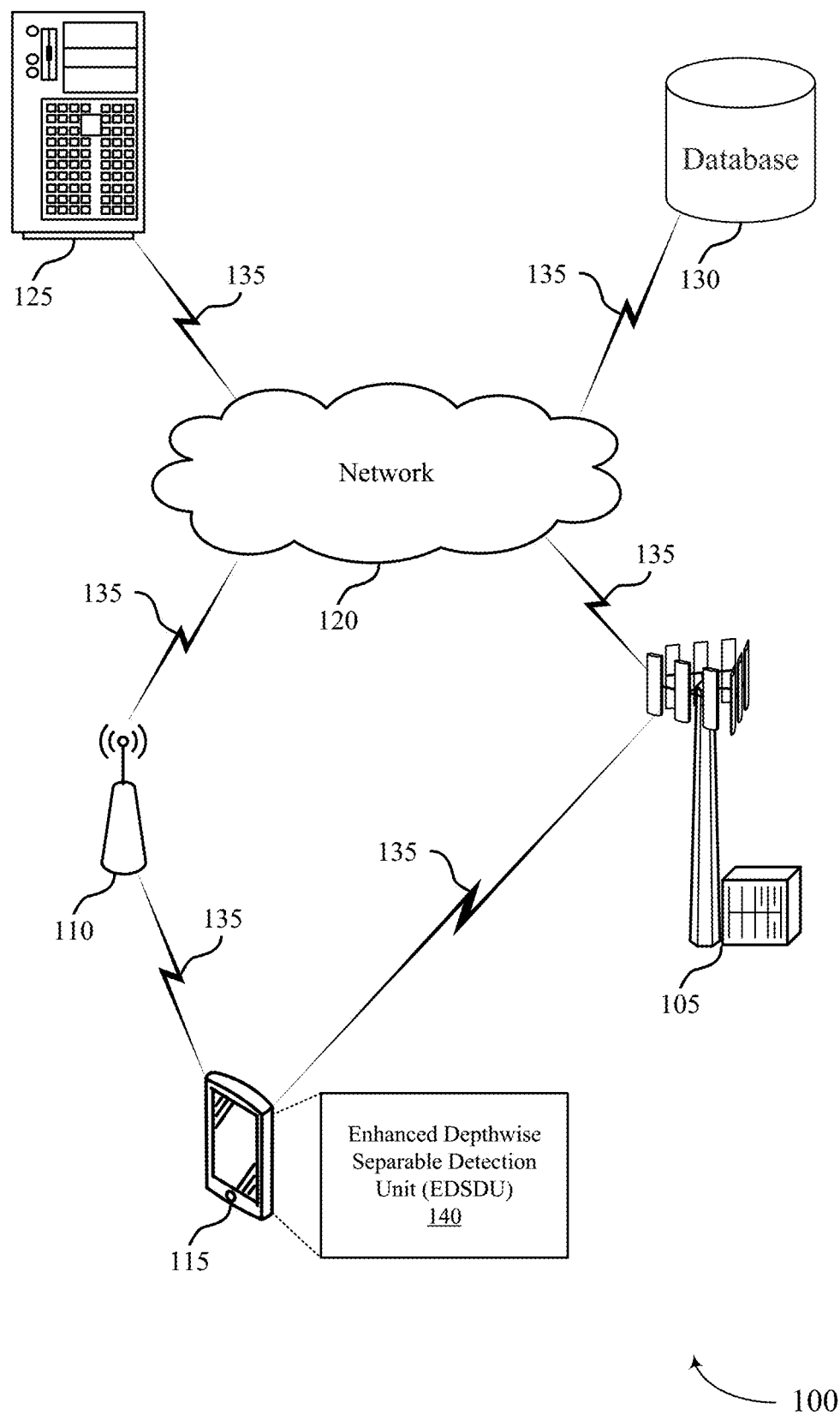
FIG. 1 illustrates an example of a system for object localization and classification that supports edge computing in accordance with aspects of the present disclosure.

FIG. 1 illustrates an example of a system 100 that supports edge computing in accordance with aspects of the present disclosure. The system 100 may include a base station 105, an access point 110, a device 115, a server 125, and a database 130. The base station 105, the access point 110, the device 115, the server 125, and the database 130 may communicate with each other via network 120 using communications links 135 to support low-complexity edge computing for object classification and object localization.

The base station 105 may wirelessly communicate with the device 115 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

In some examples, the device 115 may be stationary and/or mobile. In some examples, the device 115 may be an edge device (e.g., a network access device, a router, a routing switch, an integrated access device). An edge device may be a device that provides access into an enterprise or service provider core networks. In further examples, the device 115 may include a cellular phone, a smartphone, a personal digital assistant (PDA), a wireless communication device, a handheld device, a tablet computer, a laptop computer, a cordless phone, a display device (e.g., monitors), and/or the like. The device 115 may, additionally or alternatively, include or be referred to by those skilled in the art as a UE, a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

In some examples, the device 115, such as MTC or IoT devices (also referred to herein as an edge device), may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some devices 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The device 115 may support edge computing for object classification and object localization. In some examples, the device 115 may compute real-time object classification and object localization using deep neural networks using different detection schemes (e.g. a single shot multibox detection scheme or a you-only-look-once (YOLO) detection scheme). Deep neural networks may acquire and provide both localization and classification information of an image by processing the image a single time. For example, neural networks may have multiple convolution units to generate a series of feature maps from an original image. Each convolution unit may include one or more layers such as a convolutional layer, a batch normalization layer, a pooling layer, or an activation layer, among others. While using these schemes on an image may provide high accuracy for object classification and object localization, these schemes yield higher computational complexity on the device 115 to invoke a single inference based on a visual geometry group (VGG) network (e.g., approximately 10G MAC per inference).

In order to enable a learning framework (e.g., single shot multibox detection framework) in an edge device (e.g., a smartphone, IoT device), the techniques described herein may use MobileNet-based layers as the backbone for the learning framework. (e.g., single shot multibox detection framework neural network) and thereby reduce the complexity (e.g., MAC per inference) of the backbone. In addition to the backbone, the learning framework may be associated with one or more detection layers (which necessitate more than half of the computational resources for the object classification and object localization). These detection layers may determine and provide confidence information for the object classification and object localization. Unlike the backbone, the detection layers may be irreplaceable by a MobileNet-based layers and full convolutional layers may still be used (e.g. 3-by-3 convolution layer). Thereby, to further reduce the computational complexity on the device 115, while maintaining similar or even higher accuracy for the object classification and object localization, the techniques described herein may support configurable detection layers while maintaining the backbone layers. For example, the techniques described herein may use a single shot multibox detection framework structure and replace or modify each of the original detection layers (e.g. 3-by-3 convolution layers) to one or more configured detection layers.

As a result, the device 115 may compute object classification and object localization, while increasing accuracy and reducing power consumption and latency related to the computation in accordance with aspects of the present disclosure. For example, the device 115 may include an enhanced depthwise separable detection unit (EDSDU) 140, which may include one or more detection layers of a learning framework. In some examples, the EDSDU 140 may include two group convolutional layers, a depthwise layer, and two pointwise layers forming two units. The first unit may include a group convolutional layer, a batch normalization layer, and a pointwise layer; while a depthwise layer and pointwise layer may be included in the second unit.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, database server, communications server, home server, mobile server, or any combination thereof. The server 125 may also transmit to the device 115 a variety of information, such as instructions or commands (e.g., configuration information) relevant to supporting edge computing. The database 130 may store data that may include instructions or commands (e.g., configuration information) relevant to supporting edge computing. The device 115 may retrieve the stored data from the database 130 via the base station 105 and/or the access point 110.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. The communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in edge computing. Furthermore, the techniques described herein may provide benefits and enhancements to the operation of the device 115. For example, by supporting configurable detection layers for a learning framework such as, for example, a single-shot detector framework, the operational characteristics, such as power consumption, processor utilization, and memory usage of the device 115 may be reduced. The techniques described herein may also provide efficiency to the device 115 by reducing latency associated with processes related to edge computing.

Figure 2:
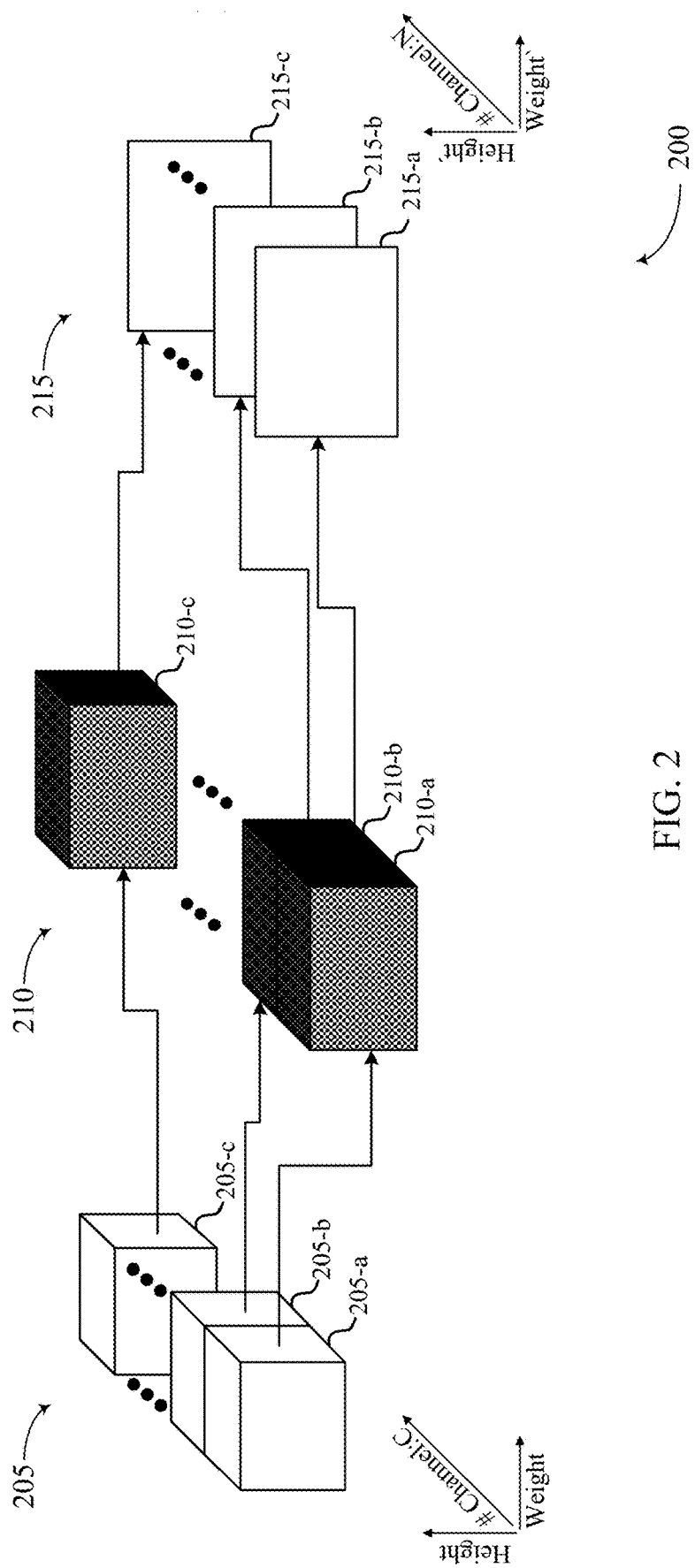
FIG. 2 illustrates an example of a group convolution layer that supports edge computing in accordance with aspects of the present disclosure.

FIG. 2 illustrates an example of a group convolution layer 200 that supports edge computing in accordance with aspects of the present disclosure. The group convolution layer 200 may support efficient and parallel convolution operations across a processor (e.g., GPU) of a device. In some examples, the group convolution layer 200 may implement aspects of the system 100. For example, a device as described herein may implement aspects of the group convolution layer 200.

The group convolution layer 200 may include a feature map that may have a quantity of input feature channels 205 associated with an image. The feature map may also have a dimension (e.g., height and width). The dimension of a feature map may include the quantity of input feature channels 205 as well as the height and width of each of the input feature channels 205. In some examples, the input feature channels 205 may be distributed (e.g., uniformly) into one or more groups. For example, a first subset of the input feature channels 205 may be distributed into a first group of input feature channels 205-$a$, a second subset of the input feature channels 205 may be distributed into a second group of input feature channels 205-$b$, and a third subset of the input feature channels 205 may be distributed into a third group of input feature channels 205-$c$, etc. A subset of input feature channels may include at least one input feature channel. That is, in some cases, a subset of input feature channels may have a single input feature channel.

The group convolution layers 210 may be a convolution filter (e.g., 3-by-3 convolution filter) for computing object classification and object localization on one or more, if not each, input feature channel 205. Within each group of input feature channels 205, convolution operations may be implemented separately or in parallel with other groups of input feature channels 205. That is, each (or at least some) of the groups of input feature channels 205-$a$ through 205-$c$ may be associated with a separate group convolution layer 210, and each group convolution layer 210 may perform a convolution on the input feature channels 205 discretely or in parallel with one or more other group convolution layers 210. For example, the first group of input feature channels 205-$a$ may be associated with a first group convolution layer 210-$a$, the second group of input feature channels 205-$b$ may be associated with a second group convolution layer 210-$b$, and the third group of input feature channels 205-$c$ may be associated with a third group convolution layer 210-$c$, etc.

The output of the group convolution layers may be a set of output features. For example, the output of the group convolution layers 210 may yield a quantity of output feature channels 215 (e.g., at least one of or both object localization and object classification scores). As shown in FIG. 2, the output of each group convolution layer 210 may be represented by a single output feature channel 215. The quantity of input feature channels 205 may be divisible by the quantity of output feature channels 215. In some examples, the quantity of output feature channels 215 may be less than the quantity of input feature channels 205, as a result of the group convolution layer 200.

Figure 3:
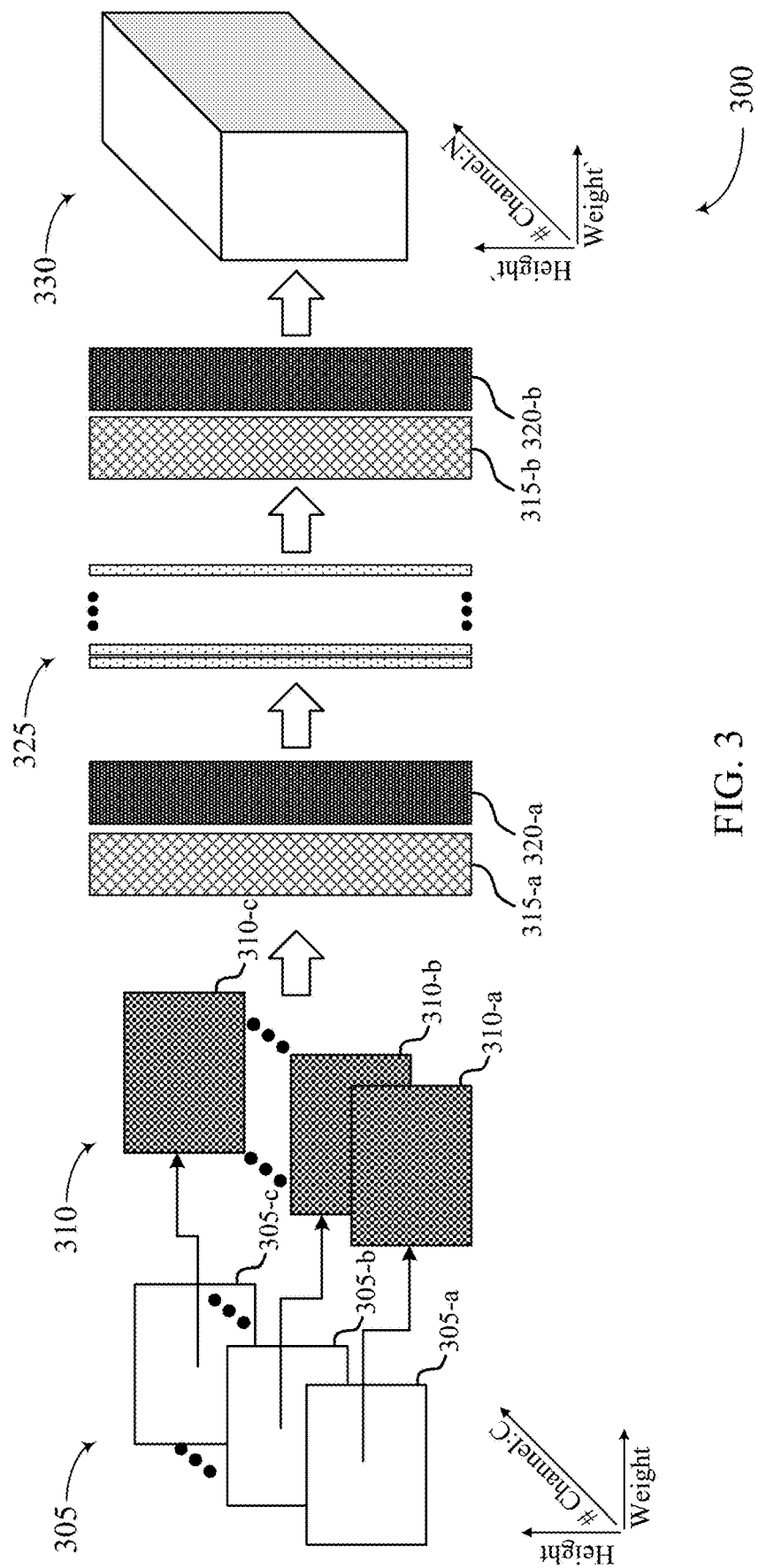
FIG. 3 illustrates an example of a MobileNet-based unit that supports edge computing in accordance with aspects of the present disclosure.

FIG. 3 illustrates an example of MobileNet-based unit 300 that supports edge computing in accordance with aspects of the present disclosure. In some examples, the MobileNet unit 300 may implement aspects of the system 100. For example, a device as described herein may implement aspects of the MobileNet-based unit 300. The MobileNet-based unit 300 may be hardware efficient in neural network architectures (e.g. MobileNet-based layers). According to some techniques, feature extraction for a deep neural network involves using a series of backbone layers, where each backbone layer may be a full convolution layer (e.g., 3-by-3 convolution layer) (e.g., as in VGG). In addition, in some learning frameworks, the detection operations may rely on the feature extraction part to be performed prior to the detection operations. As a result, the backbone layers are built with repeated full convolutional layers or alternatively MobileNet-based layers, as shown in FIG. 2, in some cases with different sizes and/or quantity of channels. The parameters for the MobileNet-based unit 300 include a quantity of input feature channels (e.g., C input channel number) and a quantity of output feature channels (e.g., N output channel number).

The MobileNet-based unit 300 may receive as input a feature map that may have a quantity of input feature channels 305 associated with an image. The feature map may also have a dimension (e.g., height, width). The dimension of a feature map may include the quantity of input feature channels 305 along with the height and width of each of the input feature channels 305. In some examples, the input feature channels 305 may be distributed uniformly or otherwise into one or more groups.

For example, a first subset of the input feature channels 305 may be distributed into a first group of input feature channels 305-a, a second subset of the input feature channels 305 may be distributed into a second group of input feature channels 305-b, and a third subset of the input feature channels 305 may be distributed into a third group of input feature channels 305-c, etc. A subset of input feature channels may include at least one input feature channel. That is, in some cases, a subset of input feature channels may have a single input feature channel. As such, a group of input feature channel may have a single input feature channel.

In accordance with the MobileNet-based unit 300, convolution operations may be split into at least two parts. The first part may include a depthwise convolution layer 310 that may perform convolution operations in parallel with each input feature channel associated with the feature map. For example, within each group of input feature channels 305, convolution operations may be implemented separate or in parallel with other groups of input feature channels 305. That is, each of the groups of input feature channels 305-a through 305-c may be associated with a depthwise convolution layer 310 (e.g., a separate depthwise convolution layer 310), and each depthwise convolution layer 310 may perform a convolution on the input feature channels 305 (e.g., in parallel with other separate depthwise convolution layers 310). For example, the first group of input feature channels 305-a may be associated with a first separate depthwise convolution layer 310-a, the second group of input feature channels 305-b may be associated with a second separate depthwise convolution layer 310-b, and the third group of input feature channels 305-c may be associated with a third separate depthwise convolution layer 310-c, etc. The depthwise convolution layer 310 may, in some examples, be a 3-by-3 convolution layer with C input feature channels and N output feature channels. By performing the convolution on the input feature channels 305 in parallel with other separate depthwise convolution layers 310, the shape of the feature map may be preserved.

A batch normalization layer 315-a and a rectified linear layer 320-a may further process the output of the depthwise convolution layer 310. The batch normalization layer 315-a and the rectified linear layer 320-a may be part of a neural network architecture (e.g. MobileNet-based unit). These layers (e.g., the batch normalization layer 315-a and the rectified linear layer 320-a) may help achieve a higher accuracy for object localization and object classification. For example, the batch normalization layer 315-a may reduce covariance shifts in object localization and object classification values between input feature channels by normalizing the output from the depthwise convolution layers 310 and subtracting a mean and dividing the result by a standard deviation. In a further example, the rectified linear layer 320-a may support a higher precision in object classification by performing a threshold operation to each element of the input feature channel (e.g., where any value less than zero is set to zero).

The second part of the MobileNet-based unit 300 may include a pointwise layer 325, which may be a pointwise convolution layer that sums all generated features maps across all input feature channels and reshapes features with a new channel number (e.g., a 1-by-1 convolution, projecting the channels output by the depthwise convolution onto a new channel space). The pointwise layer 325 may help decrease or increase a dimensionality of feature maps and may allow applying non-linearity after the convolution operation, among others. A second batch normalization layer 315-b and a second rectified linear layer 320-b may further process the output of the pointwise layer 325. These layers (e.g., the second batch normalization layer 315-b and the second rectified linear layer 320-b) may further aid in a higher accuracy for object localization and object classification. The output of the second rectified linear layer 320-b may be a set of output features. For example, the output of the second rectified linear layer 320-b may yield a quantity of output feature channels 330 (e.g., both object localization and object classification scores).

Figure 4:
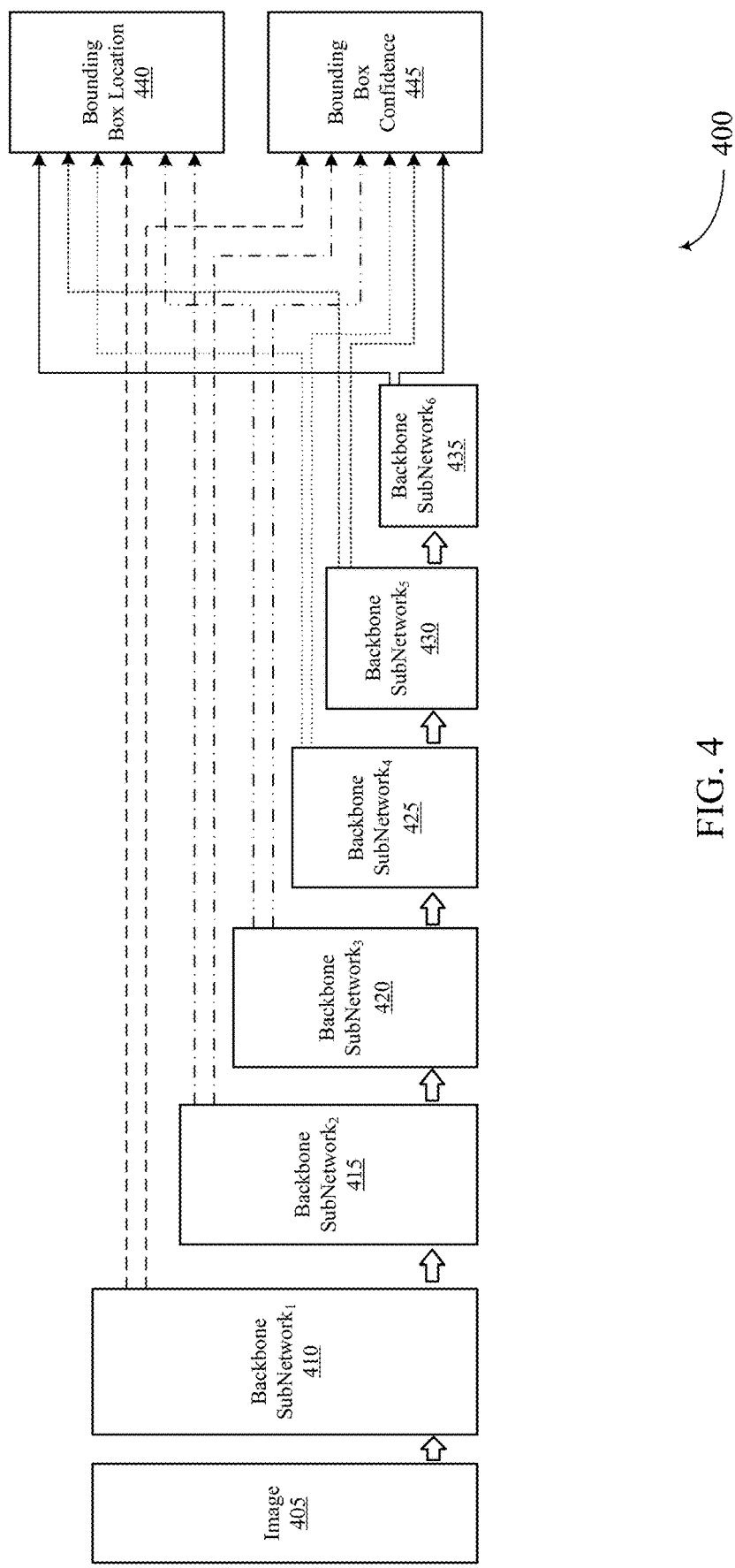
FIG. 4 illustrates an example of a single shot multibox detector framework that supports edge computing in accordance with aspects of the present disclosure.

FIG. 4 illustrates an example of a single shot multibox detector framework 400 that supports edge computing in accordance with aspects of the present disclosure. In some examples, the single shot multibox detector framework 400 may implement aspects of the system 100. Although FIG. 4 relates to the single shot multibox detector framework example, the disclosure is not limited to this example. The single shot multibox detector framework 400 may, as one example, support a fixed-size collection of bounding boxes and scores for presence of object classification instances within the bounding boxes using a convolutional network. At least some if not each of the bounding boxes and scores may be forwarded to a non-maximum suppression layer to generate a resultant object localization value and object classification value.

An image 405 may be an input to the single shot multibox detector framework 400. For example, the image 405 may be a 320-by-320-by-320 image, and the single shot multibox detector framework 400 may compute object localization and object classification on the image 405. As shown in FIG. 4, the single shot multibox detector framework 400 may include two parts in some cases. The first part may include a quantity of backbone subnetworks. For example, the single shot multibox detector framework 400 may include a first backbone subnetwork 410, a second backbone subnetwork 415, a third backbone subnetwork 420, a fourth backbone subnetwork 425, a fifth backbone subnetwork 430, and a sixth backbone subnetwork 435. Although the example single shot multibox detector framework 400 depicts six backbone subnetworks, the single shot multibox detector framework 400 may include more or less than the six backbone subnetworks depicted.

In some examples, one or more of the backbone subnetworks 410 through 435 may be substituted with another type of backbone-based network layer. For example, one or more of the backbone subnetworks may be replaced with VGG backboned-based network layer or MobileNet-based layer. In case of substituting the backbone subnetworks with a VGG backboned-based network layer, each layer of the backbone subnetwork may contain convolution layers followed by a rectified linear layer. The term "follow" or "followed" in context of layers may define a layer that serves (or is served by) another layer above it and/or is served by (or that servers) another layer below it. For example, the convolution layers may serve the rectified linear layer. Alternatively, in case of substituting the backbone subnetworks with a MobileNet-based network layer, one or more, if not each, layer of the backbone subnetwork may contain a MobileNet-based unit, for example, as shown in FIG. 3.

The single shot multibox detector framework 400 may also include detection layers (also referred to herein as detection functions). For example, the detection layers may include bounding box detections (output channels of a bounding box location 440) and confidence values of the trained classifiers (output channels of a bounding box confidence 445). That is, each backbone subnetwork 410 through 435 may be associated with the bounding box location 440 (also referred to herein as a location detector) and the bounding box confidence 445 (also referred to herein as a confidence detector). In addition, the bounding box location 440 and the bounding box confidence 445 may collectively be referred to herein as a detection layer. Along with the detection layers, the backbone subnetworks may provide both object localization (detection) and objected classification values. These networks based on the aforementioned backbone subnetworks (e.g., VGG backboned-based network layers or MobileNet-based layers) may be referred to herein as VGG single shot detection or MobileNet-based single shot detection.

In the single shot multibox detector framework 400, the detection layers (e.g., detection functions) may be generated with repeated convolution layers. In each convolution layer, there is a conventional convolution layer (e.g., C×3×3×N, padding one and striding one; where C is the quantity of input feature channels, and N is the quantity of output feature channels), followed by a batch normalization layer and a rectified linear layer. As shown in FIG. 3, the backbone subnetworks 410 through 435 may be represented as layers due to the backbone units, which may be convolution layers or MobileNet-based units. In some cases, different backbone subnetworks may correspond to different receptive fields. In some examples, the input resolution (e.g., quantity of backbone subnetworks) may be configurable based at least in part on a dimension of the image 405.

In the single shot multibox detector framework 400, the detection layers (the bounding box location 440 and the bounding box confidence 445) may be a convolution layer, which generates either location values to define proposed bounding boxes or confidence values. Each bounding box may have four location values, for example, an x-coordinate of the box center, a y-coordinate of the box center, a width and a height of the bounding box. For each set of confidence values, the bounding box confidence 445 may have a quantity of confidence values (e.g., $N_C$ values, where $N_C$ is the quantity of classes). For example, for a visual object class (VOC) 20, $N_C$ may be 21 by counting the 20 classes as well as a background class.

Table 1 below shows an example relationship between location detectors, input feature maps, and convolution layer dimension for a MobileNet-based layer framework. As shown in FIG. 4, each of the backbone subnetworks has a location detector associated with the bounding box location 440. The input feature maps column in Table 1 may be defined by a quantity of input feature channels (#C), a width dimension (W), and a height dimension (H). The structure column in Table 1 may define the convolution layer dimensions. For example, the L1-location detector may be associated with 16 output feature channels where the feature map height and width dimensions are 40×40. The 16 output feature channels represent four bounding boxes, and its related 40×40 input feature map used by the bounding box location 440 regression. In some cases, the quantity of output feature channels may be 16 or 24 for each location detector because each detector may output four or six bounding boxes, each with four values (e.g., 4×4 or 4×6 channels). In the L6-location detector example, because the input feature map has a dimension of 1×1, the convolution layer may be equivalent to a fully connected convolution layer. In the fully connected convolution layer, the input features may be defined as a vector and the location values may be determined using matrix-vector linear operation, where the layer weights may be trained and saved as two-dimensional matrices.

TABLE 1

| Location Detector in MobileNet-based Framework | | |
|---|---|---|
| Location Detector | Input Feature Maps (#C × W × H) | Structure |
| L1-location | 256 × 40 × 40 | conv(256, 16) |
| L2-location | 512 × 20 × 20 | conv(512, 24) |
| L3-location | 1024 × 10 × 10 | conv(1024, 24) |
| L4-location | 256 × 5 × 5 | conv(256, 24) |
| L5-location | 256 × 3 × 3 | conv(256, 16) |
| L6-location | 256 × 1 × 1 | conv(256, 16) |

Table 2 below shows the relationship between confidence detectors (location classifier), input feature maps, and convolution layer dimension for a MobileNet-layer framework. As shown in FIG. 4, each of the backbone subnetworks has a confidence detector associated with the bounding box confidence 445. The input feature maps column in Table 2 may be defined by a quantity of input feature channels (#C), a width dimension (W), and a height dimension (H). The structure column in Table 2 may define the convolution layer dimensions. For example, a detection layer associated with the backbone subnetwork 410 has a L1-classifier branch, with 84 output features channels and with width 40 and height 40. The 84 output feature channels are for 21 classes (including background) in the four bounding boxes, and its related 40×40 feature map. In some cases, the quantity of output feature channels may be 84 or 126 for each confidence detector (object classifier) because each detect may output four or six bounding boxes, each with 21 values (20 classes with one background class), thus 21×4 or 21×6 feature channels.

TABLE 2

| Confidence Detector in MobileNet-based Framework | | |
|---|---|---|
| Confidence Detector | Input Feature Maps (#C × W × H) | Structure |
| L1-classifier | 256 × 40 × 40 | conv(256, 84) |
| L2-classifier | 512 × 20 × 20 | conv(512, 126) |

TABLE 2-continued

Confidence Detector in MobileNet-based Framework

| Confidence Detector | Input Feature Maps (#C × W × H) | Structure |
| --- | --- | --- |
| L3-classifier | 1024 × 10 × 10 | conv(1024, 126) |
| L4-classifier | 256 × 5 × 5 | conv(256, 126) |
| L5-classifier | 256 × 3 × 3 | conv(256, 84) |
| L6-classifier | 256 × 1 × 1 | conv(256, 84) |

After the detection layers, for each detector (either location or confidence), one or more layers may follow to determine a final value for object localization and object classification. For example, in case of the location detector, a regression layer may be used. The regression layer may be a fully connected layer that may apply a weighted average from the 40×40 feature map to produce a final value for the object localization and the object classification. In case of the confidence detector, a soft max layer may be used to determine a confidence score for each feature channel (which corresponds to a confidence for a class). The soft max layer may consist of a fully connected layer and a soft max normalization layer. The soft max normalization layer may apply an exponential function to each element of the input feature, and then for each group of 21 feature channels associated with a same bounding box, doing a normalization within crossing all the 21 channels.

In some examples, modification of the backbone subnetworks 410 through 435, for example, from VGG backboned-based network layers to MobileNet-based layers, may reduce the complexity of the object localization and object classification computation (e.g., from a level of 20G MAC to 1.98G MAC in case of 320×320 input image). The re-designed layers, however, may all belong to the backbone subnetworks, and the detection layer may be somewhat complex, especially when the number of classes are large. By example, in the case of VOC 20, the framework of FIG. 3 requires 1.98G of MAC for one inference, making it a challenge for inference of such a neural network in edge devices, including CPU, GPU, or DSP. In this example, 0.8G MAC may be required for the detection layers. In case of single shot detection VGG-based layers this is less than 5%, while in case of single shot detection MobileNet-based layers this is more than 40% of the computations.

Each detection layer of the single shot multibox detector framework 400 may include a convolution layer and a rectified linear layer. However, when replacing the convolution layer with a MobileNet-based unit, as being done in the backbone subnetworks 410 through 435, accuracy of the object localization and object classification may decrease to an unacceptable range (e.g., from about 69% MAP to 67%). In some examples, it may be possible to use additional MobileNet-based units when convolution layers are replaced. However, simply applying this to the detection layers causes the following problems. Applying rectified linear layers and batch normalization layers may preserve the features but may be deficient in outputting the final bounding box information or the confidence values. That means, sampling using two MobileNet units for each detection layer may lead to deteriorate results. Additionally, when two or more MobileNet units are used (which is the case in backbone subnetworks), the first and the second typically have the same quantity of input feature channels. Therefore, the complexity for the first MobileNet unit is still relatively large. For example, such a design may lead to 1.72G MAC. As a result, no reduction in computational complexity is realized at the detection layers.

Figure 5:
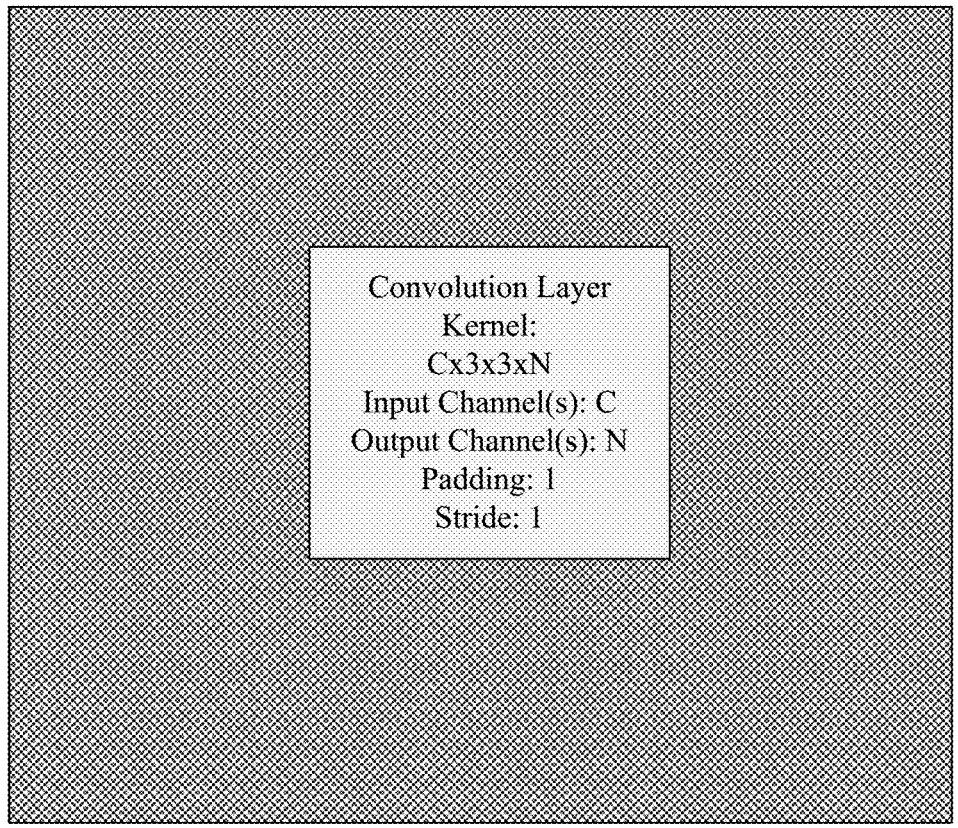
FIG. 5 illustrates an example of a detection layer that supports edge computing in accordance with aspects of the present disclosure.

FIG. 5 illustrates an example of a detection layer 500 in a single shot multibox detector that supports edge computing in accordance with aspects of the present disclosure. In some examples, the detection layer 500 may implement aspects of system 100. For example, the detection layer 500 may be a convolution layer (e.g., 3×3 convolution kernel) used in conventional single shot detectors. The detection layer 500 may have an input including a quantity of input feature channels associated with a feature map and output including a quantity of output feature channels associated with the feature map. The detection layer 500 may also have a padding value of one and a stride value of one, as described herein. The described techniques herein support efficient object classification and object localization computation, while increasing accuracy and decreasing power consumption and latency related to the computation. Specifically, the described techniques herein may support configuring the detection layer 500 to achieve the aforementioned results.

Figure 6:
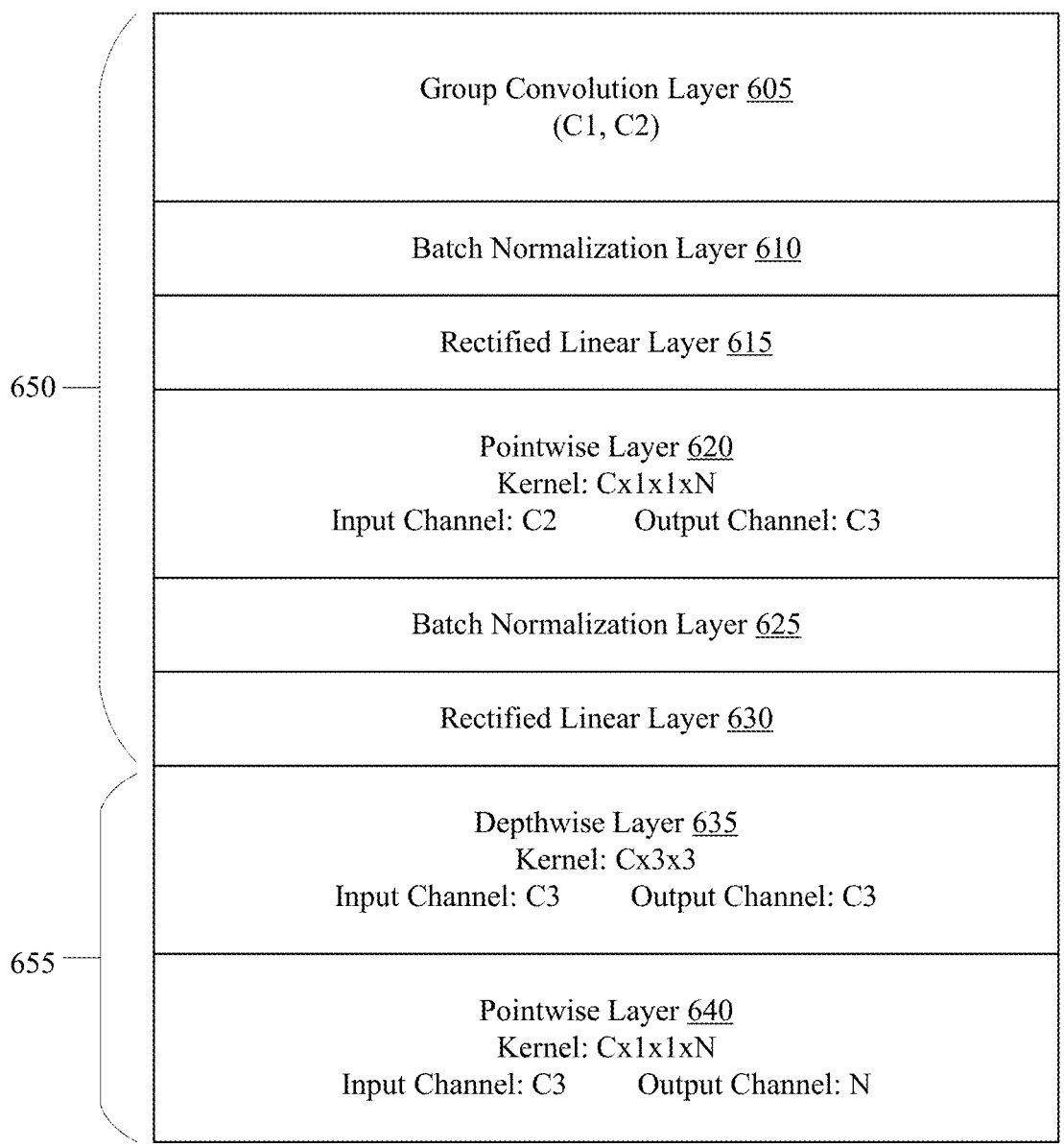
FIG. 6 illustrates an example of an enhanced depthwise separable detection unit (EDSDU) that supports edge computing in accordance with aspects of the present disclosure.

FIG. 6 illustrates an example of an enhanced depthwise separable detection unit (EDSDU) 600 that supports edge computing in accordance with aspects of the present disclosure. In some examples, the EDSDU 600 may implement aspects of system 100. The EDSDU 600 may support edge computing in edge devices. In addition, the EDSDU 600 may support computing object classification and object localization, while increasing accuracy and reducing power consumption and latency related to the computing. The EDSDU 600 may replace one or more detection layers of present learning frameworks, for example, single shot detection frameworks. The EDSDU 600 may apply to different learning frameworks (e.g., other than single shot detection frameworks), regardless of what the backbone subnetworks are (e.g., VGG), and may be extensible to any detectors which need to build up connections between a backbone subnetwork to the final detection results, including, but not limited to location information, classification information (e.g., confidence of each class).

In some examples, instead of performing a full convolutional network, which requires relatively high computational complexity, a combination of a group convolution layer, a depthwise layer, and a pointwise layer may be part of the EDSDU 600. For example, the EDSDU 600 may include one or more detection layers of a learning framework. To preserve sufficient features before outputting the object localization and object classification (e.g., class confidence information), the EDSDU 600 may include multiple depthwise layers and multiple pointwise layers. In addition, the EDSDU 600 may include two or more group convolution layers (or depthwise layers) along with pointwise layers. For example, a detection layer of the EDSDU 600 may include group convolutional layers, depthwise layers, and pointwise layers forming one or more units. The first unit 650 may include a group convolutional layer 605, a batch normalization layer 610, a rectified linear layer 615, a pointwise layer 620, a batch normalization layer 625, and a rectified linear layer 630; while the second unit 655 may include a depthwise layer 635 and pointwise layer 640.

The EDSDU 600 may have four parameters associated with it, C1 being a quantity of input feature channels, C2 and C3 being internal channel numbers (or output feature channels from a previous layer associated with C1), and N being a quantity of output feature channels. For each EDSDU 600, in order to formulate the intermediate features, a first layer of the first unit 650 (also referred to herein as a group unit) associated with the EDSDU 600 may be determined by two parameters, which may be the input feature channel C1 and output feature channel C2. In some examples, when the output feature channel C2 may be lower than the input feature channel C1 (and divisible), the first layer of the first unit 650 may be configured to be a group convolution layer (e.g., group convolution layer 605). Alternatively, if the output feature channel C2 is equal to the input feature channel C1, the first layer may be configured to be a depthwise layer (e.g., depthwise layer 635). The first layer of the first unit 650 may be followed by the batch normalization layer 610 and the rectified linear layer b 615. This type of structure (e.g., group convolution layer, batch normalization layer, and rectified linear layer) may be followed by the pointwise layer 620, which may also be followed by the batch normalization layer 625 and the rectified linear layer 630.

In some examples, for each EDSDU 600, in order to accurately produce the final object localization values and object classification values (because the batch normalization layer and the rectified linear layer) may impact the accuracy the values), the second unit 655 of the EDSDU 600 may be modified (e.g., from a MobileNet-based unit), such that no batch normalization layer and no rectified linear layer are present. That is, no batch normalization layer and no rectified linear layer follow either the depthwise layer 635 or the pointwise layer 640, or both. The term "follow" in context of layers may define a layer that serves (or is served by) another layer above it and/or is served by (or that servers) another layer below it. In this case, the depthwise layer 635 or the pointwise layer 640, or both do not serve a batch normalization layer and a rectified linear layer. Alternatively, the second unit 655 of the EDSDU 600 may, instead of including the depthwise layer 635 and the pointwise layer 640, include a group convolution layer and the pointwise layer 640.

In some cases, if each unit of the EDSDU 600 includes at least one basic layer of a group unit (or depthwise) and one basic layer of a pointwise layer, the EDSDU 600 may have only two units. Alternatively, three or more units may be present in the EDSDU 600 and in such a case, the earlier units (except the second unit 655 (e.g., having the depthwise layer and the pointwise layer)) may still be similar to a MobileNet-based unit (the first layer of which can be changed to a group unit), and include a batch normalization layer and rectified linear layer, while the last unit is a MobileNet-based unit which doesn't have a batch normalization layer and rectified linear layer.

In some examples, to reduce the complexity, the quantity of feature channels in the above mentioned two units of the EDSDU 600 (e.g., C1 and C2) may not need to be the same and C2 may be smaller than C1 (turning the first layer to a group convolutional layer instead of a depthwise layer). As such, there may be a channel reduction processes involved in the EDSDU 600, so instead of reducing the channel of features dramatically in one layer (as in conventional single shot detection frameworks) or one MobileNet-based unit (e.g., by directly replacing convolution layers with a MobileNet-based unit to produce final results, the EDSDU 600 may gradually reduce the quantity of feature channels. As a result, the first unit 650 of the EDSDU 600 already reduces the quantity of feature channels and the second unit 655 of the EDSDU 600 further reduces the quantity of feature channels. This way, the major complexity of the EDSDU 600 lies in the first unit 650 (with the quantity of output feature channel already reduced from C1 to C2 and then to C3) and the complexity of the last unit 655 of the EDSDU 600 is lessened.

With reference to FIG. 4, the EDSDU 600 may replace the detection layers associated with the backbone subnetworks. That is, the backbone subnetworks may remain the same, while the detection layers are changed from convolution layers (e.g., as shown in FIG. 5) to the EDSDU 600. Alternatively, the EDSDU 600 can be used to replace all detection layers or just one or more of them, but not all. In some cases, for each backbone subnetwork (as shown in FIG. 4), the quantity of feature channels may be tunable separately. In some cases, for each backbone subnetwork (as shown in FIG. 4), the location detector and the confidence detector may maintain the same intermediate channel widths (e.g., C1, C2 and C3 may be the same). In some examples, when the backbone subnetwork has smaller feature maps, either because of quantity of feature channels or the width and height of the feature map the detection layer may be more complex. For example, the detection layer may be a convolution layer, a full connected layer, or the first layer of the first unit 650 may be a depthwise layer.

Therefore, the EDSDU 600 may include one or more configurable detection layers to replace or modify detections layers of a learning framework (e.g., deep neural learning framework). Further, the EDSDU 600 may be configurable to include a group convolution layer, a depthwise layer, or a pointwise layer, or any combination to reduce the computational complexity of conventional techniques. The EDSDU 600 may also include a quantity of these layers to preserve sufficient feature maps from an input image before outputting the object classification confidence and object localization information. In this way, the channel of features may be gradually reduced as compared to other MobileNet single short detector solutions. For example, using the EDSDU 600, the complexity may be reduced from 1.98G MAC to 1.34G MAC (e.g., about 32% reduction).

Figure 7:
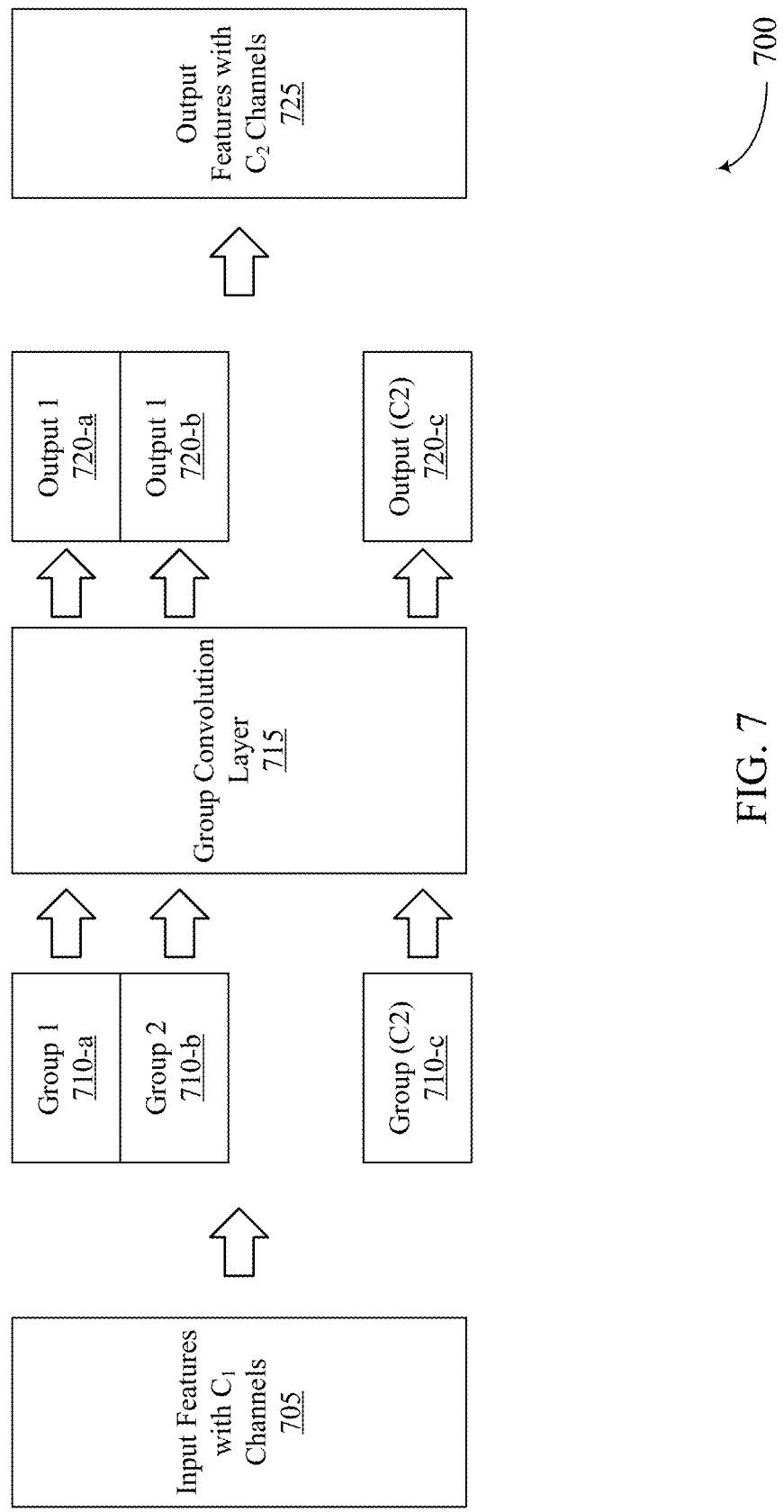
FIG. 7 illustrates an example of a feature operation in a group convolution layer that supports edge computing in accordance with aspects of the present disclosure.

FIG. 7 illustrates an example of a feature operation in a group convolution layer 700 that supports edge computing in accordance with aspects of the present disclosure. As shown in FIG. 7, a quantity of input feature channels 705 (C1 input feature channels) may be split uniformly into set of groups. The set of groups may be based at least in part on the quantity of input feature channels 705 and the quantity of output feature channels (C2 output feature channels).

For example, each group may have C1/C2 channels. For each group, its complexity is a product of C1 and C2, and the complexity processing associated with a depthwise convolution for a channel (with the same width and height). That means, the complexity of the group convolution layer 715 (C1, C2) may be similar to the complexity of a depthwise convolution layer for C1 input feature channels. According to the techniques described herein, the values of C1/C2 may be typically two.

For example, with reference to FIG. 4, for the first L1 location detector, C1 is equal to 512, while C2 is equal to 256. In this case, each group convolution layer takes two neighboring channels and performs a convolution operation (each pixel with a size of 3×3×2 window size). Therefore, the complexity (in terms of MAC) of this group convolution layer of the location detector may be equal to the complexity of a depthwise convolution for 512 channels.

Figure 8:
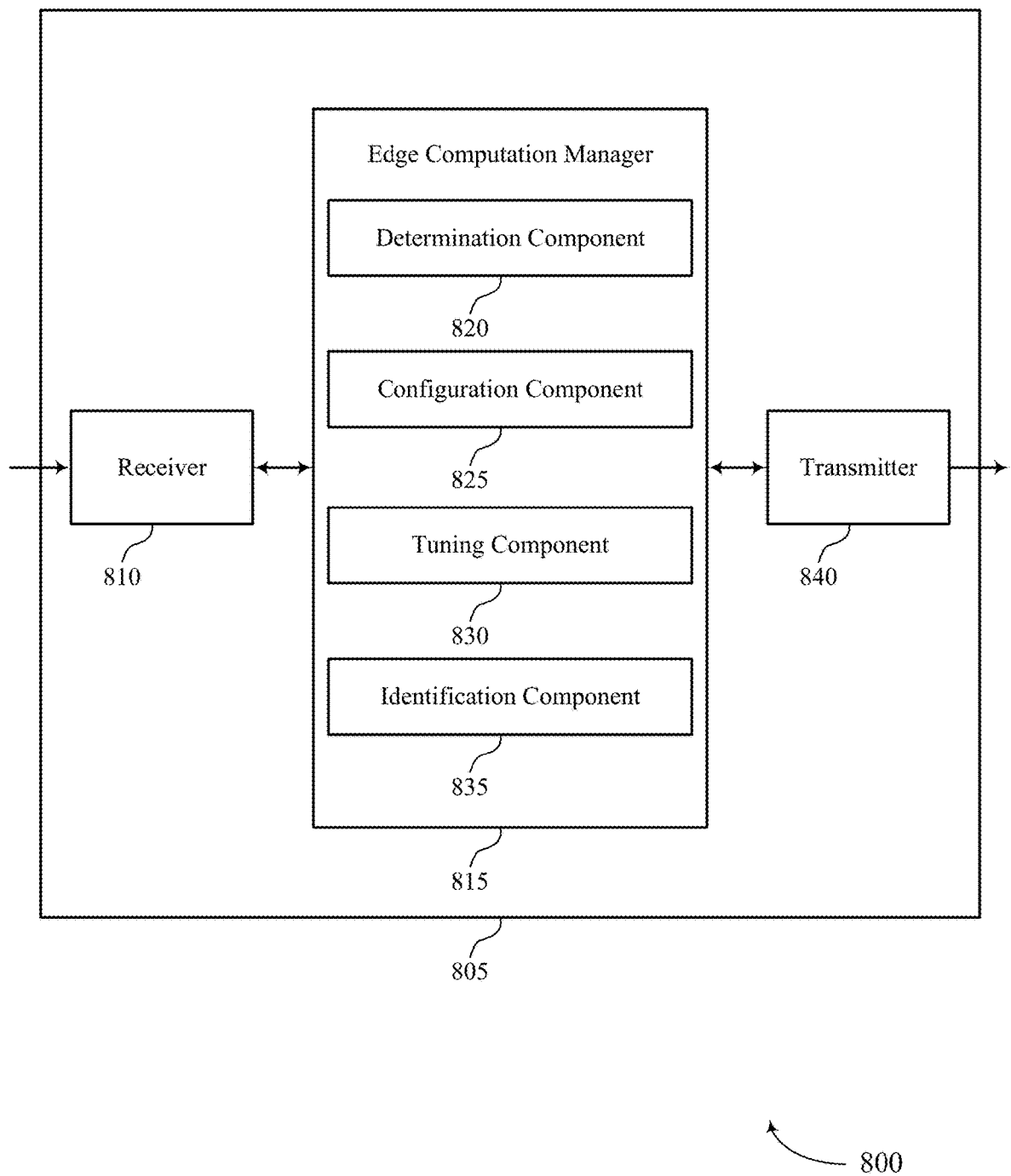
FIG. 8 shows a block diagram of a device that supports edge computing in accordance with aspects of the present disclosure.

FIG. 8 shows a block diagram 800 of a device 805 that supports edge computing in accordance with aspects of the present disclosure. The device 805 may be an example of aspects of a device as described herein. The device 805 may include a receiver 810, an edge computation manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to edge computing, etc.). Information may be passed on to other components of the device 805. The receiver 810 may be an example of aspects of the transceiver 920 described with reference to FIG. 9. The receiver 810 may utilize a single antenna or a set of antennas.

The edge computation manager 815 may be an example of aspects of the edge computation manager 815 as described herein. The edge computation manager 815, or its sub-components, may be implemented in hardware, code (e.g., software or firmware) executed by a processor, or any combination thereof. If implemented in code executed by a processor, the functions of the edge computation manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The edge computation manager 815, or its sub-components, may be physically located at various positions, including being distributed such that portions of functions are implemented at different physical locations by one or more physical components. In some examples, the edge computation manager 815, or its sub-components, may be a separate and distinct component in accordance with various aspects of the present disclosure. In some examples, the edge computation manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The edge computation manager 815 may include a determination component 820, a configuration component 825, a tuning component 830, and an identification component 835. The edge computation manager 815 may be an example of aspects of the edge computation manager 910 described herein.

The determination component 820 may determine, for a first unit of a detection layer associated with a learning framework, that a quantity of output feature channels of an input feature maps is less than or equal to a quantity of input feature channels of the input feature maps and determine, for a second unit of the detection layer associated with the learning framework, that a second quantity of output feature channels of the input feature maps is less than or equal to a second quantity of input feature channels of the input feature maps.

The configuration component 825 may configure the first unit of the detection layer with a first set of layers based on the determining, the first set of layers including a group convolution layer, a pointwise layer, a batch normalization layer, or a rectified linear layer, or a combination thereof and configure the second unit of the detection layer with a second set of layers based on the determining, where the second set of layers includes a depthwise layer or a pointwise layer, or both. In some examples, the configuration component 825 may configure the first set of layers to include a second group convolution layer after the group convolution layer, the batch normalization layer, or the rectified linear layer, or a combination thereof, based on determining that the quantity of output feature channels of the input feature maps is less than or equal to the quantity of input feature channels of the input feature maps, where configuring the first unit of the detection layer is based on configuring the first set of layers to include the second group convolution layer.

In some examples, the configuration component 825 may configure the second set of layers to include a second depthwise layer after the depthwise layer and the pointwise layer, based on determining that the second quantity of output feature channels of the input feature maps is less than or equal to the second quantity of input feature channels of the input feature maps, where configuring the second unit of the detection layer is based on configuring the second set of layers to include the second depthwise layer. In some examples, the configuration component 825 may configure the second set of layers to include a second group convolution layer based on determining that the second quantity of output feature channels of the input feature maps is less than or equal to the second quantity of input feature channels of the input feature maps, where configuring the second unit of the detection layer is based on configuring the second set of layers to include the second group convolution layer and the pointwise layer.

The tuning component 830 may tune quantity of input feature channels based on a parameter of an application associated with the object localization and classification, the parameter including at least one of a latency, a memory usage, or a processing usage, or a combination thereof, where configuring the first unit or the second unit of the detection layer, or both are based on the tuning. The identification component 835 may identify the quantity of input feature channels of the input feature maps based on a parameter of an application associated with the object localization and classification, the parameter including a latency, a memory usage, or a processing usage, or a combination thereof, where configuring the first unit or the second unit of the detection layer, or both are based on the identification. In some examples, the identification component 835 may identify the second quantity of input feature channels of the input feature maps based on the parameter of the application associated with the object localization and classification, where configuring the second unit of the detection layer are based on the identification.

The transmitter 840 may transmit signals generated by other components of the device 805. In some examples, the transmitter 840 may be collocated with a receiver 810 in a transceiver module. For example, the transmitter 840 may be an example of aspects of the transceiver 920 described with reference to FIG. 9. The transmitter 840 may utilize a single antenna or a set of antennas.

Figure 9:
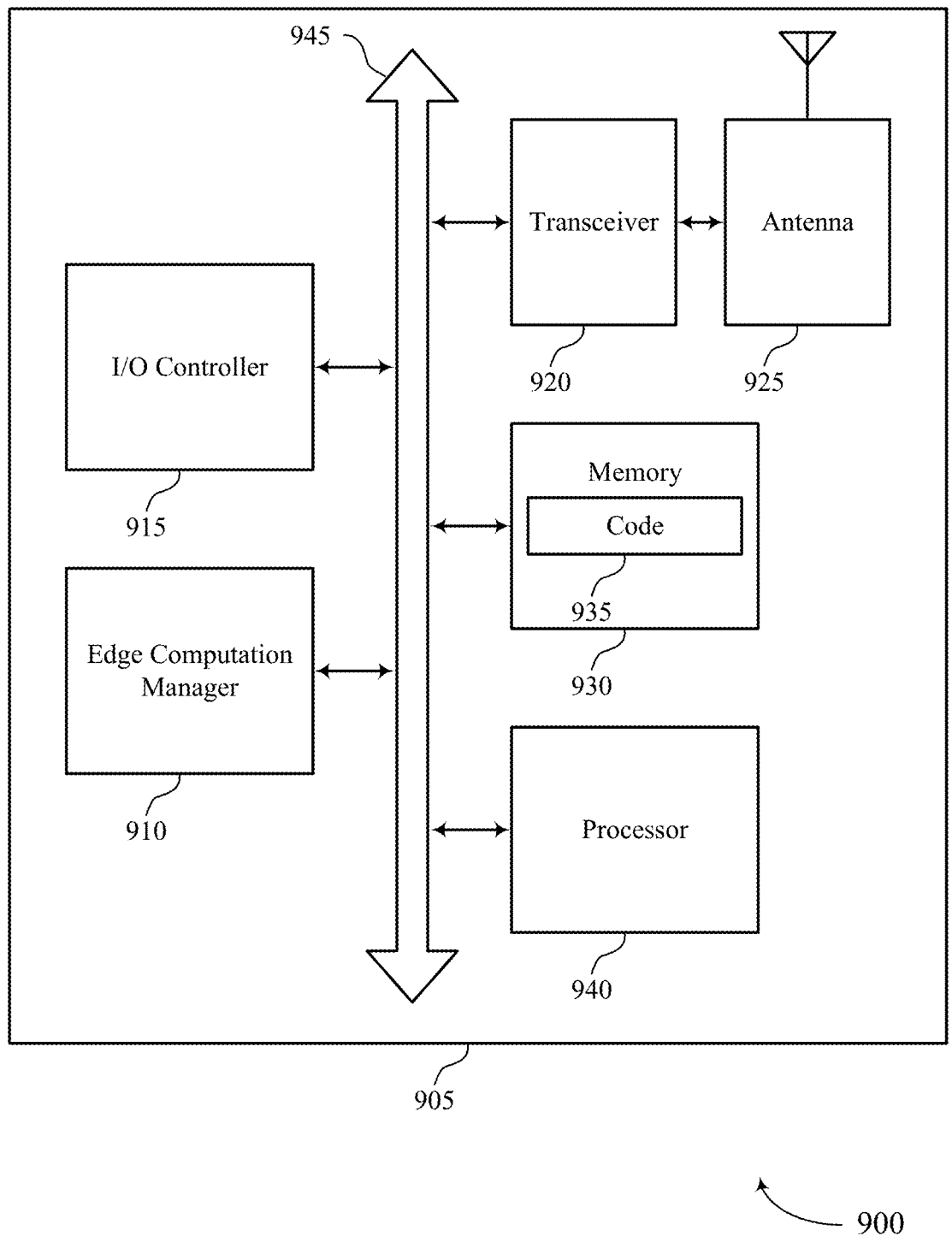
FIG. 9 shows a diagram of a system including a device that supports edge computing in accordance with aspects of the present disclosure.

FIG. 9 shows a diagram of a system 900 including a device 905 that supports edge computing in accordance with aspects of the present disclosure. The device 905 may be an example of or include the components of device 805, or a device as described herein. The device 905 may include components for bi-directional voice and data communications including components for transmitting and receiving communications, including an edge computation manager 910, an I/O controller 915, a transceiver 920, an antenna 925, memory 930, and a processor 940. These components may be in electronic communication via one or more buses (e.g., bus 945).

The edge computation manager 910 may determine, for a first unit of a detection layer associated with a learning framework, that a quantity of output feature channels of an input feature maps is less than or equal to a quantity of input feature channels of the input feature maps, determine, for a second unit of the detection layer associated with the learning framework, that a second quantity of output feature channels of the input feature maps is less than or equal to a second quantity of input feature channels of the input feature maps, configure the first unit of the detection layer with a first set of layers based on the determining, the first set of layers including a group convolution layer, a pointwise layer, a batch normalization layer, or a rectified linear layer, or a combination thereof, and configure the second unit of the detection layer with a second set of layers based on the determining, where the second set of layers includes a depthwise layer or a pointwise layer, or both.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS, ANDROID, MS-DOS, MS-WINDOWS, OS/2, UNIX, LINUX, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting edge computing).

The code 935 may include instructions to implement aspects of the present disclosure, including instructions to support object localization and classification. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
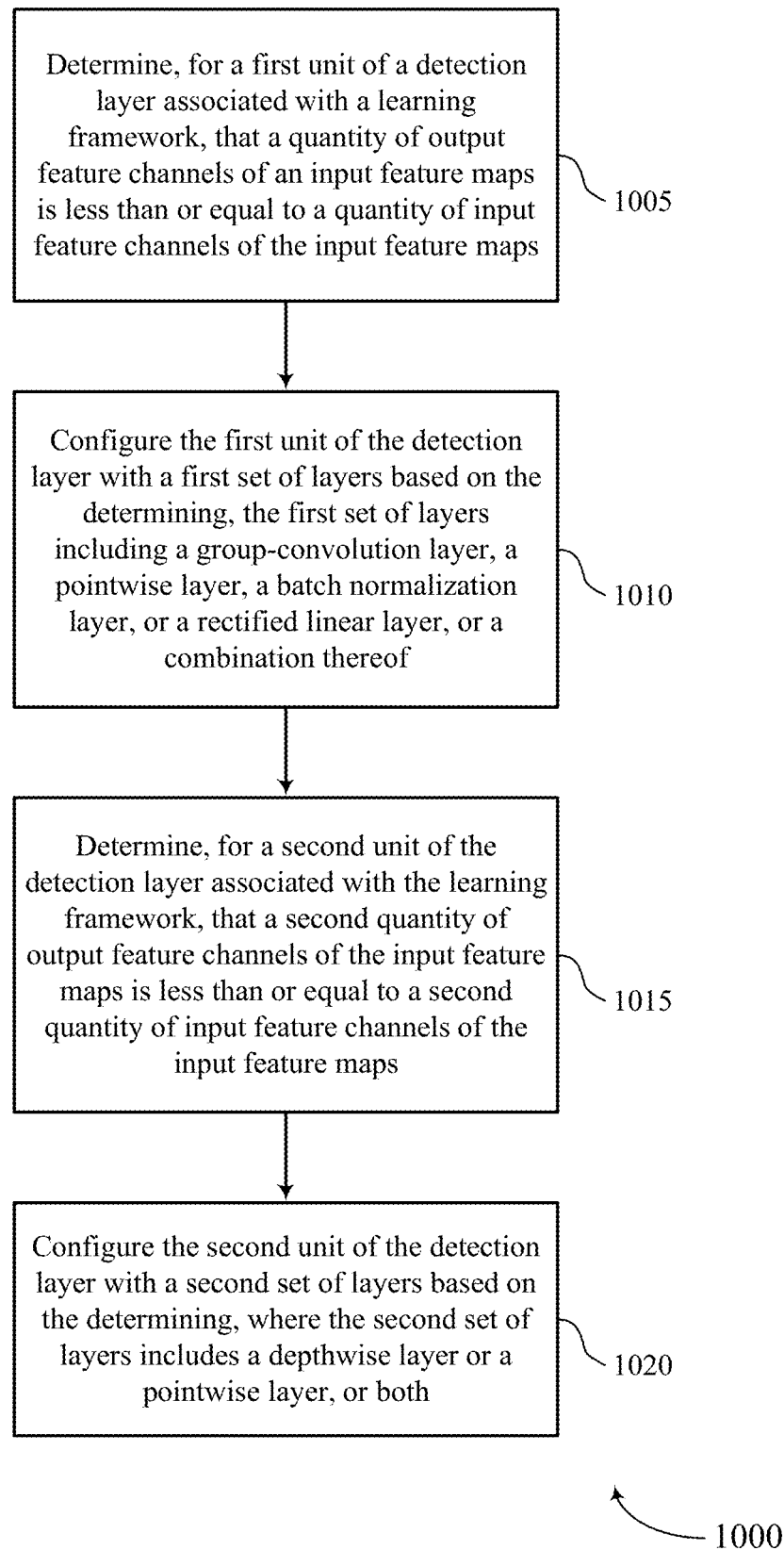
FIGS. 10 through 13 show flowcharts illustrating methods that support edge computing in accordance with aspects of the present disclosure.

FIG. 10 shows a flowchart illustrating a method 1000 that supports edge computing in accordance with aspects of the present disclosure. The operations of method 1000 may be implemented by a device or its components as described herein. For example, the operations of method 1000 may be performed by an edge computation manager as described with reference to FIGS. 8 and 9. In some examples, a device may execute a set of instructions to control the functional elements of the device to perform the functions described below. Additionally or alternatively, a device may perform aspects of the functions described below using special-purpose hardware.

At 1005, the device may determine, for a first unit of a detection layer associated with a learning framework, that a quantity of output feature channels of an input feature maps is less than or equal to a quantity of input feature channels of the input feature maps. The operations of 1005 may be performed according to the methods described herein. In some examples, aspects of the operations of 1005 may be performed by a determination component as described with reference to FIGS. 8 and 9.

At 1010, the device may configure the first unit of the detection layer with a first set of layers based on the determining, the first set of layers including a group convolution layer, a pointwise layer, a batch normalization layer, or a rectified linear layer, or a combination thereof. The operations of 1010 may be performed according to the methods described herein. In some examples, aspects of the operations of 1010 may be performed by a configuration component as described with reference to FIGS. 8 and 9.

At 1015, the device may determine, for a second unit of the detection layer associated with the learning framework, that a second quantity of output feature channels of the input feature maps is less than or equal to a second quantity of input feature channels of the input feature maps. The operations of 1015 may be performed according to the methods described herein. In some examples, aspects of the operations of 1015 may be performed by a determination component as described with reference to FIGS. 8 and 9.

At 1020, the device may configure the second unit of the detection layer with a second set of layers based on the determining, where the second set of layers includes a depthwise layer or a pointwise layer, or both. The operations of 1020 may be performed according to the methods described herein. In some examples, aspects of the operations of 1020 may be performed by a configuration component as described with reference to FIGS. 8 and 9.

Figure 11:
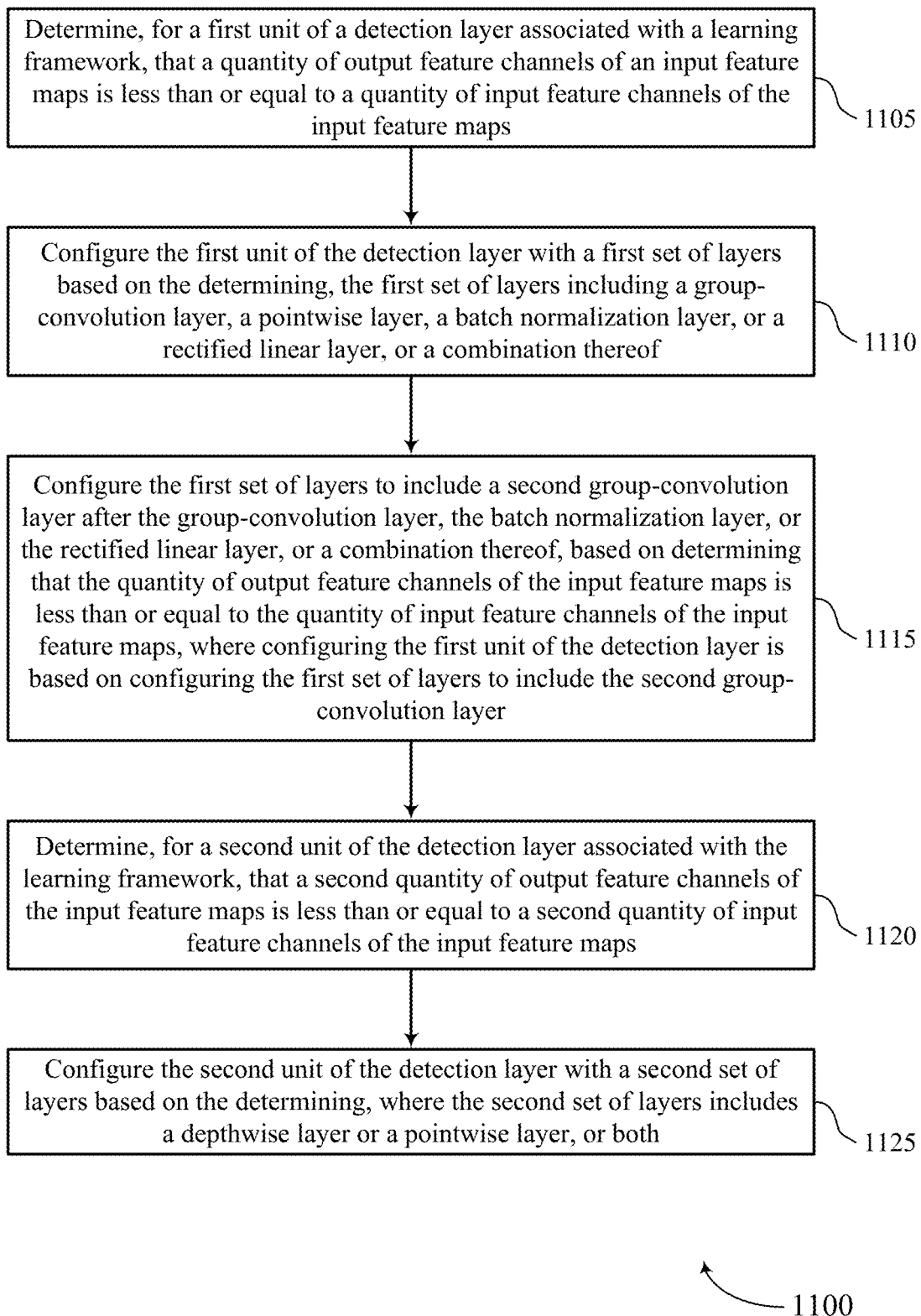

FIG. 11 shows a flowchart illustrating a method 1100 that supports edge computing in accordance with aspects of the present disclosure. The operations of method 1100 may be implemented by a device or its components as described herein. For example, the operations of method 1100 may be performed by an edge computation manager as described with reference to FIGS. 8 and 9. In some examples, a device may execute a set of instructions to control the functional elements of the device to perform the functions described below. Additionally or alternatively, a device may perform aspects of the functions described below using special-purpose hardware.

At 1105, the device may determine, for a first unit of a detection layer associated with a learning framework, that a quantity of output feature channels of an input feature maps is less than or equal to a quantity of input feature channels of the input feature maps. The operations of 1105 may be performed according to the methods described herein. In some examples, aspects of the operations of 1105 may be performed by a determination component as described with reference to FIGS. 8 and 9.

At 1110, the device may configure the first unit of the detection layer with a first set of layers based on the determining, the first set of layers including a group convolution layer, a pointwise layer, a batch normalization layer, or a rectified linear layer, or a combination thereof. The operations of 1110 may be performed according to the methods described herein. In some examples, aspects of the operations of 1110 may be performed by a configuration component as described with reference to FIGS. 8 and 9.

At 1115, the device may configure the first set of layers to include a second group convolution layer after the group convolution layer, the batch normalization layer, or the rectified linear layer, or a combination thereof, based on determining that the quantity of output feature channels of the input feature maps is less than or equal to the quantity of input feature channels of the input feature maps, where configuring the first unit of the detection layer is based on configuring the first set of layers to include the second group convolution layer. The operations of 1115 may be performed according to the methods described herein. In some examples, aspects of the operations of 1115 may be performed by a configuration component as described with reference to FIGS. 8 and 9.

At 1120, the device may determine, for a second unit of the detection layer associated with the learning framework, that a second quantity of output feature channels of the input feature maps is less than or equal to a second quantity of input feature channels of the input feature maps. The operations of 1120 may be performed according to the methods described herein. In some examples, aspects of the operations of 1120 may be performed by a determination component as described with reference to FIGS. 8 and 9.

At 1125, the device may configure the second unit of the detection layer with a second set of layers based on the determining, where the second set of layers includes a depthwise layer or a pointwise layer, or both. The operations of 1125 may be performed according to the methods described herein. In some examples, aspects of the operations of 1125 may be performed by a configuration component as described with reference to FIGS. 8 and 9.

Figure 12:
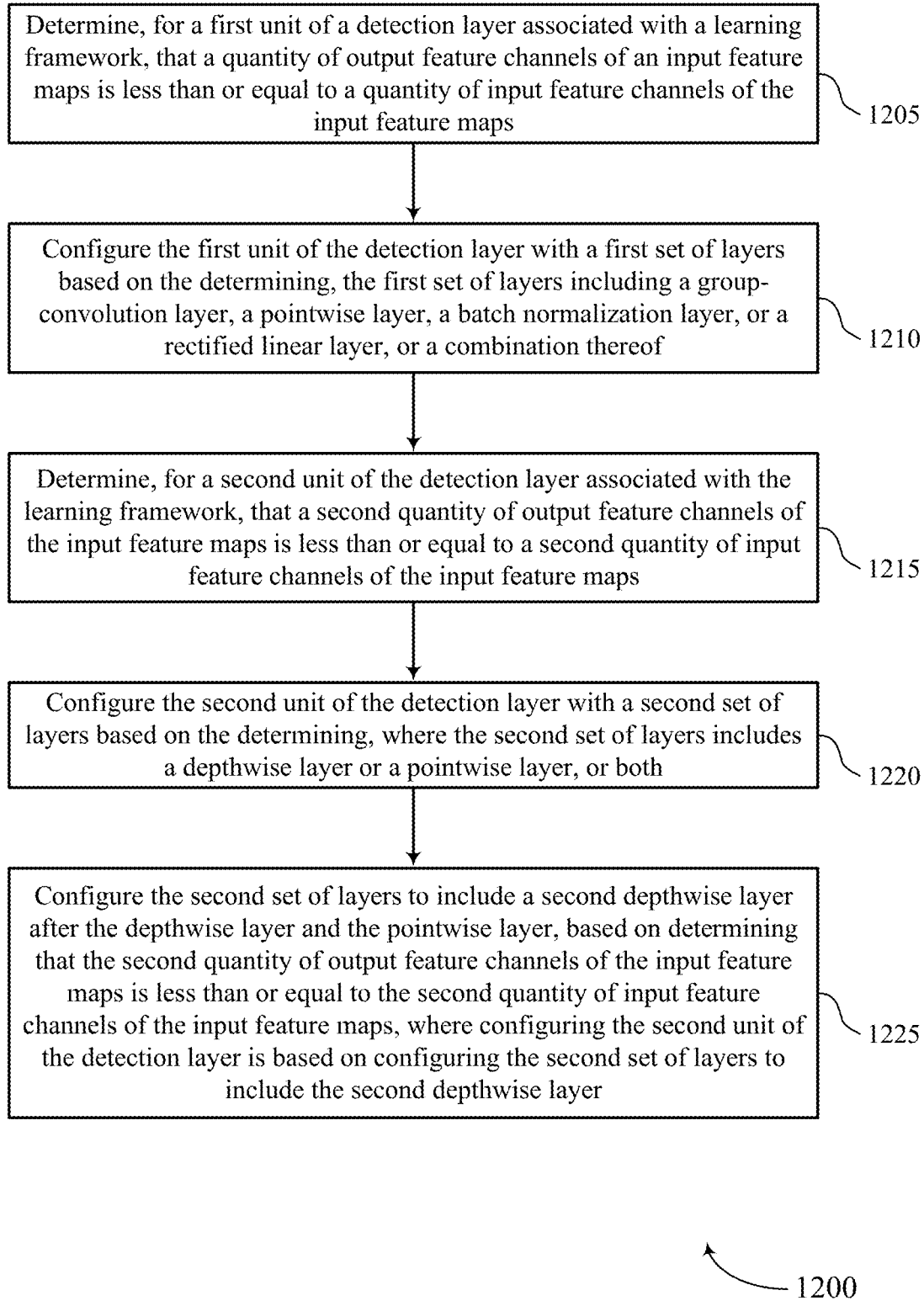

FIG. 12 shows a flowchart illustrating a method 1200 that supports edge computing in accordance with aspects of the present disclosure. The operations of method 1200 may be implemented by a device or its components as described herein. For example, the operations of method 1200 may be performed by an edge computation manager as described with reference to FIGS. 8 and 9. In some examples, a device may execute a set of instructions to control the functional elements of the device to perform the functions described below. Additionally or alternatively, a device may perform aspects of the functions described below using special-purpose hardware.

At 1205, the device may determine, for a first unit of a detection layer associated with a learning framework, that a quantity of output feature channels of an input feature maps is less than or equal to a quantity of input feature channels of the input feature maps. The operations of 1205 may be performed according to the methods described herein. In some examples, aspects of the operations of 1205 may be performed by a determination component as described with reference to FIGS. 8 and 9.

At 1210, the device may configure the first unit of the detection layer with a first set of layers based on the determining, the first set of layers including a group convolution layer, a pointwise layer, a batch normalization layer, or a rectified linear layer, or a combination thereof. The operations of 1210 may be performed according to the methods described herein. In some examples, aspects of the operations of 1210 may be performed by a configuration component as described with reference to FIGS. 8 and 9.

At 1215, the device may determine, for a second unit of the detection layer associated with the learning framework, that a second quantity of output feature channels of the input feature maps is less than or equal to a second quantity of input feature channels of the input feature maps. The operations of 1215 may be performed according to the methods described herein. In some examples, aspects of the operations of 1215 may be performed by a determination component as described with reference to FIGS. 8 and 9.

At 1220, the device may configure the second unit of the detection layer with a second set of layers based on the determining, where the second set of layers includes a depthwise layer or a pointwise layer, or both. The operations of 1220 may be performed according to the methods described herein. In some examples, aspects of the operations of 1220 may be performed by a configuration component as described with reference to FIGS. 8 and 9.

At 1225, the device may configure the second set of layers to include a second depthwise layer after the depthwise layer and the pointwise layer, based on determining that the second quantity of output feature channels of the input feature maps is less than or equal to the second quantity of input feature channels of the input feature maps, where configuring the second unit of the detection layer is based on configuring the second set of layers to include the second depthwise layer. The operations of 1225 may be performed according to the methods described herein. In some examples, aspects of the operations of 1225 may be performed by a configuration component as described with reference to FIGS. 8 and 9.

Figure 13:
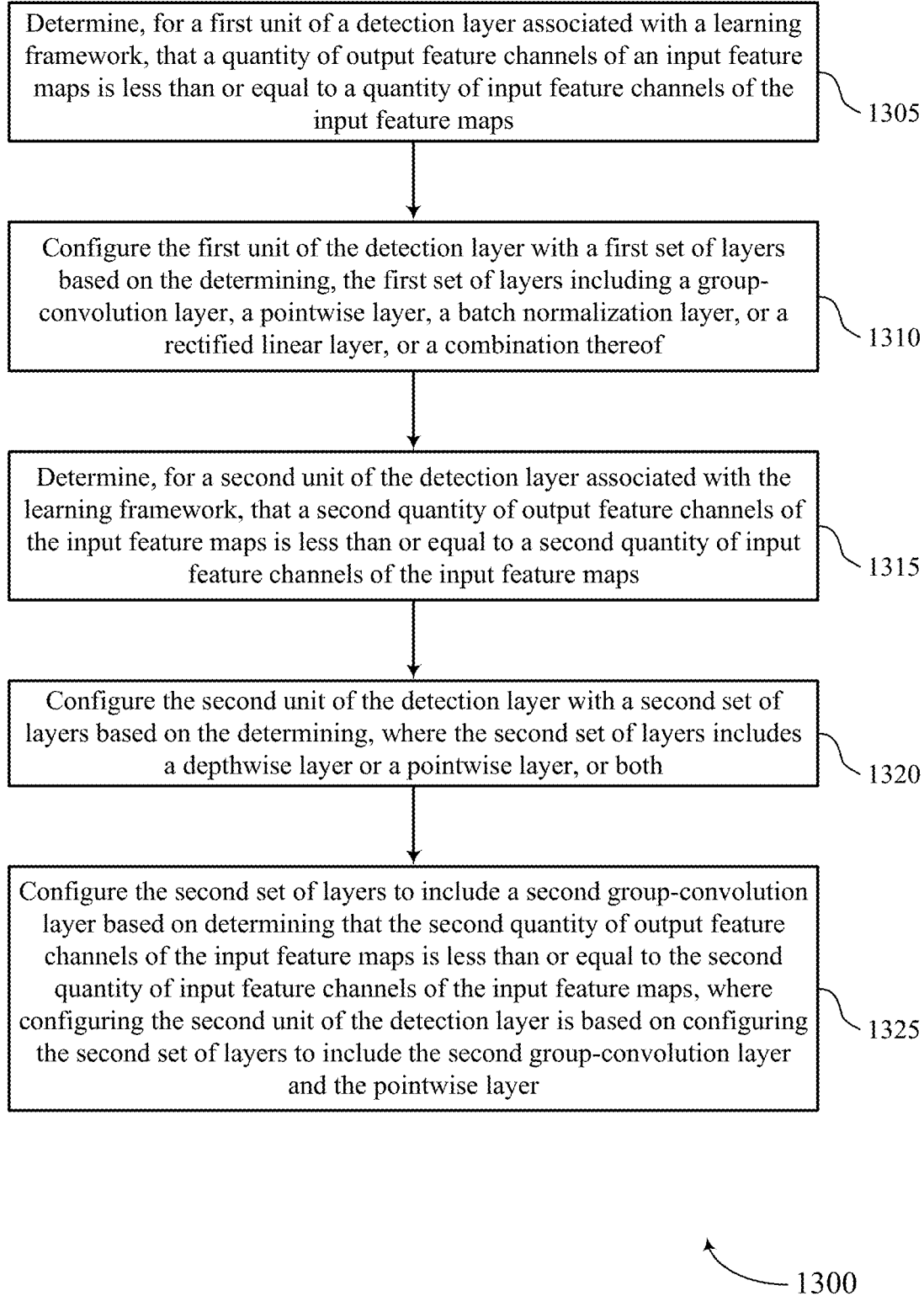

FIG. 13 shows a flowchart illustrating a method 1300 that supports edge computing in accordance with aspects of the present disclosure. The operations of method 1300 may be implemented by a device or its components as described herein. For example, the operations of method 1300 may be performed by an edge computation manager as described with reference to FIGS. 8 and 9. In some examples, a device may execute a set of instructions to control the functional elements of the device to perform the functions described below. Additionally or alternatively, a device may perform aspects of the functions described below using special-purpose hardware.

At 1305, the device may determine, for a first unit of a detection layer associated with a learning framework, that a quantity of output feature channels of an input feature maps is less than or equal to a quantity of input feature channels of the input feature maps. The operations of 1305 may be performed according to the methods described herein. In some examples, aspects of the operations of 1305 may be performed by a determination component as described with reference to FIGS. 8 and 9.

At 1310, the device may configure the first unit of the detection layer with a first set of layers based on the determining, the first set of layers including a group convolution layer, a pointwise layer, a batch normalization layer, or a rectified linear layer, or a combination thereof. The operations of 1310 may be performed according to the methods described herein. In some examples, aspects of the operations of 1310 may be performed by a configuration component as described with reference to FIGS. 8 and 9.

At 1315, the device may determine, for a second unit of the detection layer associated with the learning framework, that a second quantity of output feature channels of the input feature maps is less than or equal to a second quantity of input feature channels of the input feature maps. The operations of 1315 may be performed according to the methods described herein. In some examples, aspects of the operations of 1315 may be performed by a determination component as described with reference to FIGS. 8 and 9.

At 1320, the device may configure the second unit of the detection layer with a second set of layers based on the determining, where the second set of layers includes a depthwise layer or a pointwise layer, or both. The operations of 1320 may be performed according to the methods described herein. In some examples, aspects of the operations of 1320 may be performed by a configuration component as described with reference to FIGS. 8 and 9.

At 1325, the device may configure the second set of layers to include a second group convolution layer based on determining that the second quantity of output feature channels of the input feature maps is less than or equal to the second quantity of input feature channels of the input feature maps, where configuring the second unit of the detection layer is based on configuring the second set of layers to include the second group convolution layer and the pointwise layer. The operations of 1325 may be performed according to the methods described herein. In some examples, aspects of the operations of 1325 may be performed by a configuration component as described with reference to FIGS. 8 and 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for object localization and classification, comprising:
   a processor,
   memory in electronic communication with the processor; and
   instructions stored in the memory and executable by the processor to cause the apparatus to:
      determine, for a first unit of a detection layer associated with a learning framework, that a quantity of output feature channels of an input feature maps is less than or equal to a quantity of input feature channels of the input feature maps;
      configure the first unit of the detection layer with a first set of layers based at least in part on the determining for the first unit, the first set of layers comprising a group convolution layer, a pointwise layer, a batch normalization layer, and a rectified linear layer;
      determine, for a second unit of the detection layer associated with the learning framework, that a second quantity of output feature channels of the input feature maps is less than or equal to a second quantity of input feature channels of the input feature maps; and
      configure the second unit of the detection layer with a second set of layers based at least in part on the determining for the second unit, wherein the second set of layers comprises a depthwise layer and a pointwise layer.

2. The apparatus of claim 1, wherein the instructions are further executable by the processor to cause the apparatus to:
   configure the first set of layers to comprise a second group convolution layer after the group convolution layer, the batch normalization layer, or the rectified linear layer, or a combination thereof, based at least in part on determining that the quantity of output feature channels of the input feature maps is less than or equal to the quantity of input feature channels of the input feature maps,
   wherein the instructions to cause the apparatus to configure the first unit of the detection layer are based at least in part on configuring the first set of layers to comprise the second group convolution layer.

3. The apparatus of claim 1, wherein the instructions are further executable by the processor to cause the apparatus to:
   configure the second set of layers to comprise a second depthwise layer after the depthwise layer and the pointwise layer, based at least in part on determining that the second quantity of output feature channels of the input feature maps is less than or equal to the second quantity of input feature channels of the input feature maps,
   wherein the instructions to cause the apparatus to configure the second unit of the detection layer are based at least in part on configuring the second set of layers to comprise the second depthwise layer.

4. The apparatus of claim 1, wherein the instructions are further executable by the processor to cause the apparatus to:
   configure the second set of layers to comprise a second group convolution layer based at least in part on determining that the second quantity of output feature channels of the input feature maps is less than or equal to the second quantity of input feature channels of the input feature maps,
   wherein the instructions to cause the apparatus to configure the second unit of the detection layer are based at least in part on configuring the second set of layers to comprise the second group convolution layer and the pointwise layer.

5. The apparatus of claim 4, wherein configuring the second set of layers comprises configuring the second set of layers such that the depthwise layer is absent from the second set of layers based at least in part on configuring the second set of layers with the second group convolution layer.

6. The apparatus of claim 1, wherein the instructions are further executable by the processor to cause the apparatus to:
   tune quantity of input feature channels based at least in part on a parameter of an application associated with the object localization and classification, the parameter comprising at least one of a latency, a memory usage, or a processing usage, or a combination thereof,
   wherein the instructions to cause the apparatus to configure the first unit or the second unit of the detection layer, or both are based at least in part on the tuning.

7. The apparatus of claim 1, wherein the instructions are further executable by the processor to cause the apparatus to:
   identify the quantity of input feature channels of the input feature maps based at least in part on a parameter of an application associated with the object localization and classification, the parameter comprising a latency, a memory usage, or a processing usage, or a combination thereof,
   wherein the instructions to cause the apparatus to configure the first unit or the second unit of the detection layer, or both are based at least in part on the quantity of input feature channels of the input feature maps.

8. The apparatus of claim 7, wherein the instructions are further executable by the processor to cause the apparatus to:
   identify the second quantity of input feature channels of the input feature maps based at least in part on the parameter of the application associated with the object localization and classification,
   wherein the instructions to cause the apparatus to configure the second unit of the detection layer are based at least in part on the second quantity of input feature channels of the input feature maps.

9. The apparatus of claim 1, wherein the learning framework comprises a single-shot detector framework.

10. The apparatus of claim 1, wherein the first unit and the second unit of the detection layer associated with the learning framework are associated with a backbone subnetwork.

11. The apparatus of claim 1, wherein the second unit of the detection layer is absent from the batch normalization layer or the rectified linear layer, or both.

12. The apparatus of claim 1, wherein the second quantity of input feature channels of the input feature maps associated with the second unit is less than the quantity of input feature channels of the input feature maps associated with the first unit.

13. The apparatus of claim 1, wherein a width and height of the input feature maps associated with the second unit is less than a width and height of the input feature maps associated with the first unit.

14. A method for object localization and classification, comprising:
- determining, for a first unit of a detection layer associated with a learning framework, that a quantity of output feature channels of an input feature maps is less than or equal to a quantity of input feature channels of the input feature maps;
- configuring the first unit of the detection layer with a first set of layers based at least in part on the determining for the first unit, the first set of layers comprising a group convolution layer, a pointwise layer, a batch normalization layer, and a rectified linear layer;
- determining, for a second unit of the detection layer associated with the learning framework, that a second quantity of output feature channels of the input feature maps is less than or equal to a second quantity of input feature channels of the input feature maps; and
- configuring the second unit of the detection layer with a second set of layers based at least in part on the determining for the second unit, wherein the second set of layers comprises a depthwise layer and a pointwise layer.

15. The method of claim 14, further comprising:
- configuring the first set of layers to comprise a second group convolution layer after the group convolution layer, the batch normalization layer, or the rectified linear layer, or a combination thereof, based at least in part on determining that the quantity of output feature channels of the input feature maps is less than or equal to the quantity of input feature channels of the input feature maps,
- wherein configuring the first unit of the detection layer is based at least in part on configuring the first set of layers to comprise the second group convolution layer.

16. The method of claim 14, further comprising:
- configuring the second set of layers to comprise a second depthwise layer after the depthwise layer and the pointwise layer, based at least in part on determining that the second quantity of output feature channels of the input feature maps is less than or equal to the second quantity of input feature channels of the input feature maps,
- wherein configuring the second unit of the detection layer is based at least in part on configuring the second set of layers to comprise the second depthwise layer.

17. The method of claim 14, further comprising:
- configuring the second set of layers to comprise a second group convolution layer based at least in part on determining that the second quantity of output feature channels of the input feature maps is less than or equal to the second quantity of input feature channels of the input feature maps,
- wherein configuring the second unit of the detection layer is based at least in part on configuring the second set of layers to comprise the second group convolution layer and the pointwise layer.

18. The method of claim 17, wherein configuring the second set of layers comprises configuring the second set of layers such that the depthwise layer is absent from the second set of layers based at least in part on configuring the second set of layers with the second group convolution layer.

19. The method of claim 14, further comprising:
- tuning quantity of input feature channels based at least in part on a parameter of an application associated with the object localization and classification, the parameter comprising at least one of a latency, a memory usage, or a processing usage, or a combination thereof, wherein configuring the first unit or the second unit of the detection layer, or both are based at least in part on the tuning.

20. An apparatus for object localization and classification, comprising:
- means for determining, for a first unit of a detection layer associated with a learning framework, that a quantity of output feature channels of an input feature maps is less than or equal to a quantity of input feature channels of the input feature maps;
- means for configuring the first unit of the detection layer with a first set of layers based at least in part on the determining for the first unit, the first set of layers comprising a group convolution layer, a pointwise layer, a batch normalization layer, and a rectified linear layer;
- means for determining, for a second unit of the detection layer associated with the learning framework, that a second quantity of output feature channels of the input feature maps is less than or equal to a second quantity of input feature channels of the input feature maps; and
- means for configuring the second unit of the detection layer with a second set of layers based at least in part on the determining for the second unit, wherein the second set of layers comprises a depthwise layer and a pointwise layer.

* * * * *